(12) United States Patent
Brinkman et al.

(10) Patent No.: US 8,546,494 B2
(45) Date of Patent: Oct. 1, 2013

(54) ISOCYANATE-TERMINATED PREPOLYMER

(71) Applicant: Rohm and Haas Company, Philadelphia, PA (US)

(72) Inventors: Larry F. Brinkman, Woodstock, IL (US); Amira Avril Marine, Algonquin, IL (US); David E. Vietti, Cary, IL (US); Joseph J. Zupancic, Glen Ellyn, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/693,495

(22) Filed: Dec. 4, 2012

(65) Prior Publication Data
US 2013/0150534 A1    Jun. 13, 2013

Related U.S. Application Data

(60) Provisional application No. 61/568,702, filed on Dec. 9, 2011.

(51) Int. Cl.
| C08L 61/20 | (2006.01) |
| C08G 18/00 | (2006.01) |
| C07C 69/74 | (2006.01) |
| C07C 69/73 | (2006.01) |

(52) U.S. Cl.
USPC ............... 525/428; 528/74.5; 560/1; 560/181

(58) Field of Classification Search
USPC ...................... 525/428; 560/181, 1; 528/74.5
See application file for complete search history.

(56) References Cited

U.S. PATENT DOCUMENTS

| 2,188,882 | A |  | 1/1940 | Clocker |  |
| 2,569,420 | A |  | 9/1951 | Kosmin |  |
| 6,121,398 | A |  | 9/2000 | Wool et al. |  |
| 2010/0222541 | A1 | * | 9/2010 | Zupancic | 528/74.5 |
| 2010/0266799 | A1 | * | 10/2010 | Koonce et al. | 428/36.9 |

FOREIGN PATENT DOCUMENTS
DE           635926       9/1936

OTHER PUBLICATIONS

Khot, et al., "Development and Application of Triglyceride-Based Polymers and Composites", J. Applied Polymer Science, vol. 82, pp. 703-723 (2001).
Quesada, et al., "Preparation of Alkenyl Succinic Anhydrides from Vegetable Oil FAME", JAOCS, vol. 80, No. 3, pp. 281-286 (2003).
Bickford, et al, "The Reaction of Nonconjugated Unsaturated Fatty Acid Esters With Maleic Anhydride", Oil & Soap, vol. 19, pp. 23-27 (1942).
Eren, et al., "Polymerization of Maleic Anhydride-Modified Plant Oils with Polyols", J. Applied Polymer Science, vol. 90, pp. 197-202 (2003).

* cited by examiner

*Primary Examiner* — Randy Gulakowski
*Assistant Examiner* — Christopher M Rodd
(74) *Attorney, Agent, or Firm* — Kenneth Crimaldi

(57) ABSTRACT

An isocyanate-terminated prepolymer having three components. The first component is 30-60 wt % polymerized residues of a first polyol containing a substituent of formula (I)

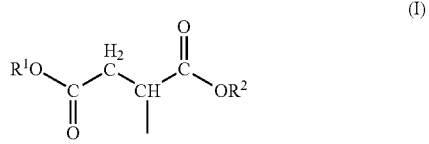

attached via a carbon-carbon single bond to a saturated carbon atom in a fatty acid hydrocarbyl group; wherein $R^1$ and $R^2$ are esterified residues of aliphatic or cycloaliphatic diols; and wherein the first polyol contains: (i) from 0.33 to 0.4 units of formula (I) per fatty acid hydrocarbyl group, and (ii) from 0 to 12 wt % esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the first polyol has a hydroxyl number from 75 to 150 mg KOH/g. The second component is 40-55 wt % polymerized residues of diphenyl methane diisocyanate. The third component is 0-20 wt % polymerized residues of a glycol having $M_n$ from 300 to 3500.

10 Claims, No Drawings

ISOCYANATE-TERMINATED PREPOLYMER

BACKGROUND

This invention relates generally to an isocyanate-terminated prepolymer produced from biological materials.

The use of triglycerides in preparation of alkyd resins is well known. Typically, these resins are produced without modifying the fatty acid chains, but rather by utilizing the triglyceride ester groups to react with acids and glycols to form polyesters. Such resins usually have high molecular weights and require solvent to deliver the resin in a coating application.

Production of condensation products useful in paints from reaction of triglycerides with maleic anhydride, followed by reaction with ethylene glycol has been described. For example, U.S. Pat. No. 2,188,882 to Clocker discloses the reaction of linseed oil with 10% by weight maleic anhydride at 250° C., followed by reaction of the product with a small amount of ethylene glycol at about 180° C. However, the material produced in this way is extremely viscous and must be dispersed in a solvent to be used. A prepolymer made from a hydroxy-functional material derived from biological materials which has a relatively low viscosity and is useable in a solvent-free composition would be a desirable product.

STATEMENT OF INVENTION

The present invention is directed to an isocyanate-terminated prepolymer comprising: (a) 30-60 wt % of polymerized residues of a first polyol comprising a substituent of formula (I)

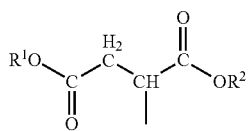

attached via a carbon-carbon single bond (shown attached to the "CH" group in formula I) to a saturated carbon atom in a fatty acid hydrocarbyl group; wherein $R^1$ and $R^2$ are esterified residues of aliphatic or cycloaliphatic diols; and wherein the first polyol comprises: (i) from 0.33 to 0.4 units of formula (I) per fatty acid hydrocarbyl group, and (ii) from 0 to 12 wt % of esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the first polyol has a hydroxyl number from 75 to 150 mg KOH/g; (b) 40-55 wt % polymerized residues of diphenyl methane diisocyanate (MDI); and (c) 0-20 wt % polymerized residues of a glycol having $M_n$ from 300 to 3500.

The present invention is further directed to a two-component urethane system comprising: (1) an isocyanate-terminated prepolymer having 9 to 17 wt % isocyanate groups and comprising: (a) 30-60 wt % polymerized residues of a first polyol comprising a substituent of formula

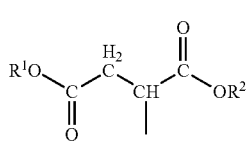

attached via a carbon-carbon single bond (shown attached to the "CH" group in formula I) to a saturated carbon atom in a fatty acid hydrocarbyl group; wherein $R^1$ and $R^2$ are esterified residues of aliphatic or cycloaliphatic diols; and wherein the first polyol comprises: (i) from 0.33 to 0.4 units of formula (I) per fatty acid hydrocarbyl group, and (ii) from 0 to 12 wt % of esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the first polyol has a hydroxyl number from 75 to 150 mg KOH/g; (b) 40-55 wt % polymerized residues of diphenyl methane diisocyanate (MDI); and (c) 0-20 wt % polymerized residues of a glycol having $M_n$ from 300 to 3500; and (2) a second polyol having a hydroxyl number (OHN) from 50 to 250 mg KOH/g and $M_n$ from 300 to 5000.

DETAILED DESCRIPTION

All percentages are weight percentages, and all temperatures are in ° C., unless otherwise indicated. The "triglycerides" from which the first polyol are made are natural fats or oils comprising glycerine triesters of fatty acids. Preferably, triglycerides are in the form of vegetable oils, but animal fats can also be used as a starting material if they have sufficiently low saturated fatty acid content. Fatty acids are acyclic aliphatic carboxylic acids containing from 8 to 22 carbon atoms; typically, they contain from 12 to 22 carbon atoms. In most natural triglycerides, at least 95% of the fatty acid residues have from 16 to 18 carbon atoms. With respect to carbon-carbon bonds, the fatty acids may be saturated, monounsaturated or polyunsaturated (typically 2 or 3 carbon-carbon double bonds). The "fatty acid hydrocarbyl group" is the alkyl or alkenyl chain attached to the carboxylic acid group. Natural fats may also contain small amounts of other esterified, or free fatty acids, as well as small amounts (1-4%) of phospholipids, e.g., lecithin, and very small amounts (<1%) of other compounds, e.g., tocopherols. Preferably, the free fatty acid content of the triglyceride is no greater than 10%, alternatively no greater than 5%, alternatively no greater than 3%. Triglycerides suitable as starting materials have a saturated fat content of no greater than 42%, preferably no greater than 29%, preferably no greater than 27%, preferably no greater than 25%, preferably no greater than 23%, preferably no greater than 20%, preferably no greater than 17%, preferably no greater than 16%. The saturated fat content of triglycerides is the weight percent of fatty acid chains in the triglyceride that are saturated, normalized to 100%. Preferred triglycerides include soybean oil, corn oil, sunflower oil, canola oil, hempseed oil, flaxseed oil, olive oil, peanut oil, safflower oil, cottonseed oil and palm oil. More preferred triglycerides include soybean oil, corn oil, sunflower oil, canola oil, hempseed oil, flaxseed oil, olive oil, peanut oil and safflower oil. Particularly preferred triglycerides include soybean oil, corn oil, sunflower oil, canola oil, hempseed oil, flaxseed oil, olive oil and safflower oil. The triglyceride can be isolated from naturally occurring seed sources or from genetically modified seed sources which may have enhanced levels of certain fatty acids, e.g., monounsaturated fatty acids or conjugated polyunsaturated fatty acids. A "glycol" is an aliphatic compound having two hydroxyl groups, preferably a polyether, preferably an oligomer or ethylene oxide and/or propylene oxide.

The first polyol of this invention contains polymerized and esterified residues of maleic anhydride, as depicted in formula (I), attached to fatty acid hydrocarbyl groups. The fatty acid hydrocarbyl group can be designated as "R" in the following formula of a fatty acid ester: $RCO_2R^3$; wherein $R^3$ is an esterified residue of a diol, and R is a fatty acid hydrocarbyl group having from 15 to 17 carbon atoms. The structure shown here below shows the attachment of the esterified maleic anhydride residue to the fatty acid hydrocarbyl group at a CH group adjacent to a carbon-carbon double bond.

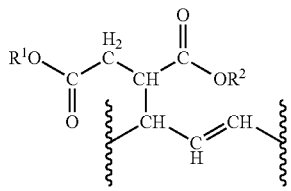

The esterified maleic anhydride residues are present in the first polyol in an amount of at least 0.33 units per fatty acid hydrocarbyl group; preferably at least 0.34, preferably at least 0.345, preferably at least 0.35, preferably at least 0.355; preferably no more than 0.39, preferably no more than 0.385, preferably no more than 0.38, preferably no more than 0.375, preferably no more than 0.37. The number of units of maleic anhydride residue per fatty acid hydrocarbyl group can be calculated from the number of moles of maleic anhydride divided by the number of moles of unsaturated fatty acid chains in the triglyceride. This number also can be determined experimentally by methods used for structure determination, e.g., $^1$H or $^{13}$C NMR. The first polyol is a hydroxy-terminated polyester with a hydroxyl number from 75 to 150 mg KOH/g, preferably from 90 to 125, preferably from 95 to 115. Preferably, the viscosity of the polyol at 25° C. is from 100 to 3500 cps (100 to 3500 mPa·s), preferably from 500 to 2000 cps (500 to 2000 mPa·s), preferably from 500 to 1500 cps (500 to 1500 mPa·s). Preferably, the first polyol contains from 12% to 30% polymerized residues of at least one $C_2$-$C_{40}$ aliphatic or cycloaliphatic diol; preferably at least 15%, preferably at least 16%, preferably at least 17%, preferably at least 18%; preferably no more than 29%, preferably no more than 28%, preferably no more than 27%, preferably no more than 26%, preferably no more than 25%, preferably no more than 23%. Preferably, the first polyol contains from 1.5 to 3 moles of diol residues per mole of polyol; preferably at least 1.7 moles, preferably at least 2 moles; preferably no more than 2.5 moles, preferably no more than 2.35 moles. Preferably, the $C_2$-$C_{40}$ diol is selected from the group consisting of ethylene glycol, diethylene glycol, triethylene glycol, polyethylene glycol (maximum Mn=400), propylene glycol, dipropylene glycol, polypropylene glycol (maximum Mn=400), 1,4-butanediol, 2-methyl-1,3-propanediol, neopentyl glycol, 1,4-dimethanol-cyclohexane and 1,6-hexanediol. Small amounts of residues of compounds with more than three hydroxy groups may be present to increase branching, e.g., pentaerythritol. Preferably, the amount of residues of compounds with more than three hydroxy groups is no more than 0.5% of the total amount of diol(s), preferably no more than 0.3%, preferably no more than 0.2%, preferably no more than 0.1%. Preferably, the $C_2$-$C_{40}$ diol is an aliphatic $C_2$-$C_8$ diol, alternatively a $C_2$-$C_6$ diol, alternatively a $C_2$-$C_4$ diol. Preferably, the amount of triol residues present in excess of the amount due to glycerol from the triglyceride is no more than 2% of the total amount of diol and triol residues in excess of the amount due to glycerol from the triglyceride, preferably no more than 1%, preferably no more than 0.5%, preferably no more than 0.3%, preferably no more than 0.1%. Suitable triols include, e.g., glycerol, trimethylol ethane and trimethylol propane.

In formation of the first polyol, maleic anhydride reacts with the unsaturated triglyceride chains to form a carbon-carbon bond. Without being bound to theory, it is believed that maleic anhydride reacts with the unsaturated fatty acid hydrocarbyl groups via an Alder Ene reaction, as depicted below for an oleate chain of a triglyceride.

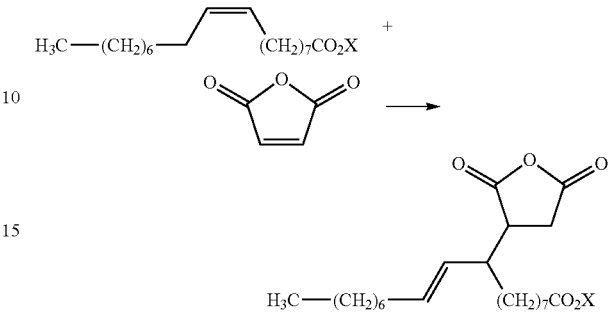

Only one of two possible isomeric products is shown. "X" represents the remaining part of the triglyceride which contains the oleate chain. The same reaction may occur on other unsaturated fatty acid chains in the same triglyceride molecule. Subsequent reaction of this product with $C_2$-$C_{40}$ diol(s) opens and esterifies the anhydride, and also is capable of transesterifying the triglyceride to form a fatty acid ester with a group of formula (I) attached to a $CH_2$ group in the fatty acid hydrocarbyl group, as illustrated below for the case where the $C_2$-$C_{40}$ diol is ethylene glycol.

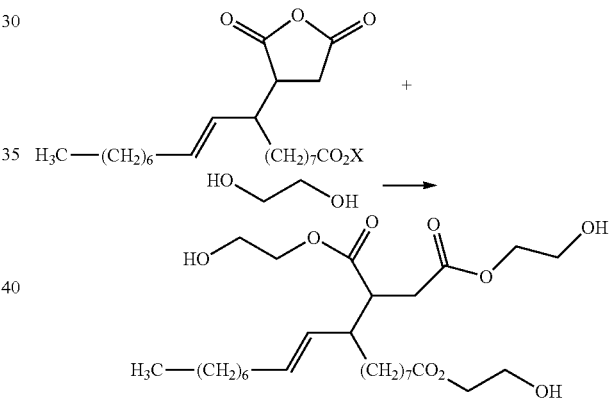

Of course glycerol liberated by transesterification of the triglyceride will esterify acid groups to form some species more branched than that shown above, and there will also be esterified saturated fatty acids, and other species in a complex mixture. It is possible that a fatty acid hydrocarbyl group bearing an esterified maleic anhydride moiety still may be attached to an incompletely transesterified triglyceride, as shown below

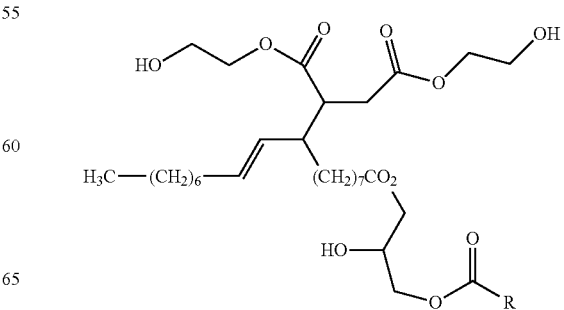

where R represents a fatty acid hydrocarbyl group which may be substituted by an esterified maleic anhydride. The free hydroxyl groups present in the various species may react with anhydride functionality on other chains, or if present, added anhydrides or diacids, and then with additional diol/triol, including glycerol from the triglyceride, generating a hydroxy-terminated polyester substituent. Preferably, in preparation of the polyol, the $C_2$-$C_{40}$ diol or triol is added in sufficient amount to react with all anhydride or carboxylic acid functionality, thereby producing a polyol which is a hydroxy-terminated polyester with a low acid number, preferably less than 15 mg KOH/g, more preferably less than 10, most preferably less than 5.

In unusual cases where the double bonds in a polyunsaturated fatty acid chain have isomerized to become a conjugated 1,4-diene, it is possible for the maleic anhydride to undergo a Diels-Alder cycloaddition reaction with the diene to form a cyclohexene structure. The isomerization may result from chemically induced isomerization or be produced in a genetically modified organism. However, even in such cases, the predominant product of maleic anhydride addition is as shown above.

The first polyol further comprises polymerized residues of a $C_4$-$C_{12}$ anhydride, $C_4$-$C_{12}$ diacid or $C_4$-$C_{12}$ lactone in an amount from 0 to 12% (not including the amount stated above for maleic anhydride residues, which is approximately 8 to 15%); preferably the anhydride, diacid or lactone amount is at least 1%, preferably at least 2%, preferably at least 3%, preferably at least 4%; preferably no more than 11%, preferably no more than 10%, preferably no more than 9%, preferably no more than 8%, preferably no more than 7%, preferably no more than 6%. Preferably, the $C_4$-$C_{12}$ anhydride, diacid or lactone is a $C_4$-$C_{10}$ anhydride or diacid. Preferably, it is selected from the group consisting of adipic acid, azelaic acid, succinic acid, sebacic acid, fumaric acid, maleic acid, phthalic anhydride, isophthalic acid, terephthalic acid, maleic anhydride, succinic anhydride, tetrahydrophthalic anhydride, hexahydrophthalic anhydride and caprolactone. Preferably, the $C_4$-$C_{12}$ anhydride, diacid or lactone is a $C_8$-$C_{12}$ aromatic anhydride or diacid, preferably a $C_8$-$C_{10}$ aromatic anhydride or diacid. The product illustrated above, derived from maleic-anhydride-modified oleic acid and ethylene glycol, would be expected to react further on some or all available hydroxyl groups to give a structure like the one shown below for reaction with phthalic anhydride.

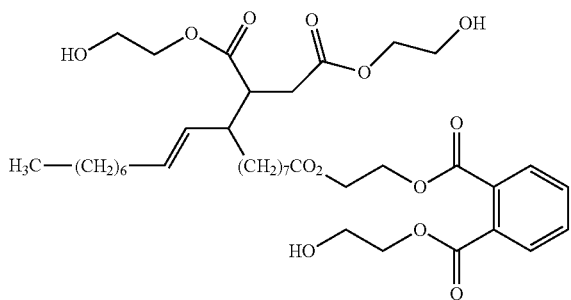

In addition to polymerized residues of the first polyol, the isocyanate-terminated prepolymer contains polymerized residues of diphenyl methane diisocyanate (MDI). Preferably, MDI comprising a mixture of its o,p' and p,p' isomers is used to form the prepolymer, preferably 10-90% o,p' and 10-90% p,p', preferably 10-60% o,p' and 40-90% p,p', preferably 15-50% o,p' and 50-85% p,p', preferably 20-40% o,p' and 60-80% p,p'. Small amounts of the o,o' isomer may also be present, i.e., no more than 5%, preferably no more than 3%.

The isocyanate-terminated prepolymer preferably has 11 to 15 wt % isocyanate groups, preferably 12 to 14 wt %. The isocyanate-terminated prepolymer optionally contains polymerized residues of a glycol having $M_n$ from 300 to 3500 in an amount up to 20 wt %, preferably up to 17 wt %, preferably up to 14 wt %, preferably up to 11 wt %, preferably at least 2 wt %, preferably at least 4 wt %, preferably at least 6 wt %. Preferably, $M_n$ is at least 400, preferably at least 600, preferably at least 900; preferably no more than 3000, preferably no more than 2500, preferably no more than 2000. Preferably, the glycol comprises polymerized residues of ethylene glycol, propylene glycol, butylene glycol, 1,4-butanediol or a mixture thereof, preferably polyethylene glycol, polypropylene glycol or a mixture thereof.

Preferably, the first polyol is produced by the steps of: (a) allowing the triglyceride to react with 0.11 to 0.13 g maleic anhydride/g triglyceride at a temperature from 150° C. to 250° C. to form a maleated triglyceride; and (b) allowing the maleated triglyceride to react with at least one $C_2$-$C_{40}$ diol and 0 to 15 wt % of at least one $C_4$-$C_{12}$ anhydride, $C_4$-$C_{12}$ diacid or $C_4$-$C_{12}$ lactone (this amount does not include maleic anhydride from step (a), now part of the maleated triglyceride), based on total weight of ingredients from both steps, (a) and (b), at a temperature from 170° C. to 260° C. Preferably, the reaction temperature in step (a) is from 180° C. to 235° C., preferably from 190° C. to 230° C. Preferably, the reaction pressure is from about atmospheric pressure (about 100 kPa) to 1750 kPa, preferably at least 200 kPa, preferably at least 300 kPa, preferably no more than 700 kPa. Preferably, the reaction temperature in step (b) is from 180° C. to 250° C., preferably from 190° C. to 240° C. Preferably, the reaction mixture is cooled below 100° C. after step (a) to control the exothermic initial reaction in step (b), and then reheated to the indicated reaction temperature. Reaction times of course will vary with the other conditions, and can be determined easily by one skilled in the art, but typically are in the range from 1 hour to 10 hours, preferably from 2 to 8 hours. Preferably, an esterification/transesterification catalyst is present during step (b) in an amount no more than 0.1 wt %, alternatively 0.01 wt %. These catalysts are well known in the art and include tin, titanium, bismuth and zirconium catalysts. Tin catalysts are preferred, especially alkyltin tris-alkanoates, hydroxybutyl tin oxide, tetra-alkoxy titanates and bismuth alkanoates. Preferably, 1 wt % to 12 wt % of a $C_4$-$C_{12}$ anhydride, diacid or lactone is added in step (b), preferably 2 wt % to 9 wt %. Preferably, the anhydride, diacid or lactone is added to the maleated triglyceride at approximately the same time as the $C_2$-$C_{40}$ diol(s) (and triol(s), if used). Preferably, the anhydride, diacid or lactone is added slightly before the diol(s) to allow good mixing with the maleated triglyceride prior to the esterification/transesterification reactions with the diol(s) and triol(s), i.e., no more than 60 minutes prior to anhydride/diacid addition, preferably no more than 30 minutes, preferably no more than 20 minutes, preferably no more than 10 minutes.

Preferably, the triglyceride is allowed to react with at least 0.115 g maleic anhydride/g triglyceride; preferably no more than 0.125 g, preferably no more than 0.12 g.

Preferably, the amount of $C_2$-$C_{40}$ diol(s) added to make the first polyol is from 12% to 30%, based on total ingredients in the reaction mixture; preferably at least 15%, preferably at least 16%, preferably at least 17%, preferably at least 18%; preferably no more than 29%, preferably no more than 28%, preferably no more than 27%, preferably no more than 25%.

Preferably, the reaction mixture contains from 1.5 to 3 moles of diol per moles of total ingredients; preferably at least 1.7 moles, preferably at least 2 moles; preferably no more than 2.5 moles, preferably no more than 2.35 moles. Preferably, at least one triol also is present in an amount no more than 2% of the total amount of diols and triols, preferably no more than 1%, preferably no more than 0.5%, preferably no more than 0.3%, preferably no more than 0.2%. Small amounts of compounds with more than three hydroxy groups may be added to increase branching, e.g., pentaerythritol. Preferably, the amount of compounds with more than three hydroxy groups is no more than 0.5% of the total amount of diols and triols, preferably no more than 0.3%, preferably no more than 0.2%, preferably no more than 0.1%. Preferably, the reactants added to the reaction mixture in step (b) are substantially free of triols and higher-functional hydroxy compounds, i.e., only diols are added. Preferably, the amount of diols, triols, and tetra-ols added is sufficient to react with all of the carboxyl functionalities and to result in a polyol with a hydroxyl number from 75 to 150 mg KOH/g, preferably from 90 to 125, preferably from 95 to 115. This amount can be calculated easily from the amounts of other ingredients.

Preferably, the amount of $C_4$-$C_{12}$ anhydride, diacid or lactone added to make the first polyol, based on total weight of ingredients in both steps, is at least 1%, preferably at least 2%, preferably at least 3%; preferably at least 4%, preferably no more than 11%, preferably no more than 10%, preferably no more than 9%, preferably no more than 8%, preferably no more than 7%.

Preferably, a small amount of a mono-functional hydroxy-reactive compound is added to the reaction to make the first polyol along with diol/anhydride/lactone to decrease hydroxyl functionality and, possibly, to limit molecular weight and viscosity. Carboxylic acids are suitable for this purpose, e.g., $C_7$-$C_{22}$ carboxylic acids, alternatively $C_7$-$C_{14}$ carboxylic acids, alternatively $C_7$-$C_{10}$ carboxylic acids. Aromatic carboxylic acids are preferred. Preferably, these compounds do not have hydroxyl or amino functional groups.

The amount of such compounds that may be added is from 3% to 10% of the total ingredients; preferably at least 4%, preferably at least 5%; preferably no more than 8%, preferably no more than 6%. Particularly preferred compounds include, e.g., benzoic acid and octanoic acid.

The isocyanate-terminated prepolymer is formed by reaction of the first polyol with MDI, and optionally, with a glycol having $M_n$ from 300 to 2000. Preferably, the temperature is from 20° C. to 110° C., preferably from 80° C. to 95° C. The reaction time is dependent on the temperature and can be determined by means well known in the art.

Preferably, the second polyol is a hydroxy-terminated polyester. Preferably, the second polyol has a hydroxyl number from 75 to 150 mg KOH/g, preferably from 90 to 125, preferably from 95 to 115. Preferably, the second polyol has a hydroxyl functionality from 1.9 to 2.5, preferably from 1.95 to 2.4, preferably from 2 to 2.3. Preferably, the second polyol comprises from 45 to 100% of a polyol having a substituent of formula (I)

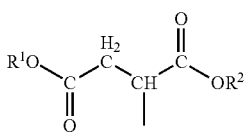

attached via a carbon-carbon single bond (shown attached to the "CH" group in formula I) to a saturated carbon atom in a fatty acid hydrocarbyl group; wherein $R^1$ and $R^2$ are esterified residues of aliphatic or cycloaliphatic diols; and wherein the second polyol comprises: (i) from 0.3 to 0.5 units of formula (I) per fatty acid hydrocarbyl group, and (ii) from 0 to 15 wt % of esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the second polyol has a hydroxyl number from 100 to 225 mg KOH/g.

In the two-component system of this invention, the relative proportions of isocyanate groups to isocyanate-reactive groups may vary as desired, preferably within a molar ratio of NCO/OH groups of 0.9:1 to 2:1. In some embodiments of the invention, the NCO/OH group molar ratio is from 1:1 to 1.8:1, alternatively from 1.1:1 to 1.6:1, alternatively from 1.2:1 to 1.5:1.

The system of the present invention contemplates the employment of two components, which preferably are mixed using a suitable mixer (e.g., an electrically, pneumatically, or an otherwise powered mechanical mixer, or a static mixer) prior to or during application to a substrate to form the bonding agent. Thus, the isocyanate component typically will be packaged separately from the polyol component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. Preferably, the temperature does not exceed 65° C. As desired, heating or cooling may be applied to the resulting laminate.

The bonding agent of the present invention is useful for bonding two to five substrates together. The substrates may be similar material or dissimilar material. In a preferred embodiment, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. In a preferred embodiment, the substrate layers are provided in the form of rolls of substrate material. The sheets may be on the order of 0.5 to 10 mils in thickness. Larger thicknesses are also possible, as are smaller thicknesses (e.g., on the order of 5 or more microns).

The compositions of the present invention can be applied to desired substrates using conventional application techniques such as solvent-less laminators, rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Viscosities were measured using a Brookfield viscometer operating at a temperature of approximately 25° C. Spindle numbers 2 and 5 were used as appropriate for the viscosity ranges measured. Polyols were prepared as described in the following procedures.

Example 1

Preparation of Bio-Based Polyester Resin

| Item | Monomer/Intermediate | Charge (g) |
| --- | --- | --- |
| 1 | Soybean Oil (Pure Vegetable Oil) | 1861.20 |
| 2 | Maleic Anhydride | 223.35 |
| 3 | Diethylene Glycol | 743.82 |
| 4 | Pentaerythritol | 0.76 |
| 5 | Adipic Acid | 299.58 |
| 6 | FASCAT 9100 (Hydroxybutyltin oxide) | 0.4000 |

1 Charge Items 1-2 to vessel at Ambient Temperature (25-30° C.)
2 Heat resin to 225° C. under Nitrogen with stirring
3 Maintain resin at 225° C. for 2 Hours, Monitor InProcess Viscosity every 1 Hr
4 Cool Resin to about 65° C.
5 When Resin is at 85° C. Add Item #4, 5 and Continue cooling to 65° C.
6 When resin is at 65° C. Add Item #3; Maintain at 65-75° C. for 0.50 Hrs.
7 Heat slowly to 100 and maintain for 30 mins
8 Heat resin to 225° C. and hold at 225° C., Monitor AV and viscosity every 1 hr
9 Maintain resin at 225° C. until AV<15
10 When AV<15 apply Vacuum; Maintain at 225° C. and ca. 325 mm until AV<5
11 Cool Resin to about 150° C.; Filter and Package The final resin had the following properties: Acid Value (AV) 2.4, Hydroxyl Number (OHN) 112, Mn 2000, Mw 22550, and Viscosity at 25° C. 1289 cps.

Example 2

Preparation of Bio-Based Polyester Resin

| Item | Monomer/Intermediate | Charge (g) |
| --- | --- | --- |
| 1 | Soybean Oil (Pure Vegetable Oil) | 2176.60 |
| 2 | Maleic Anhydride | 261.58 |
| 3 | Diethylene Glycol | 561.78 |
| 4 | Pentaerythritol | 0.81 |
| 5 | Phthalic Anhydride | 2.39 |
| 6 | FASCAT 9100 (Hydroxybutyltin oxide) | 0.4500 |

1 Charge Items 1-2 to vessel at Ambient Temperature (25-30° C.)
2 Heat resin to 225° C. under Nitrogen with stirring
3 Maintain resin at 225° C. for 2 Hours, Monitor AV and viscosity every 1 hr
4 Cool Resin to about 65° C.
5 When Resin is at 85° C. Add Item #4, 5 and 6; Continue cooling to 65° C.
6 When resin is at 65° C. Add Item #3; Maintain at 65-75° C. for 0.50 Hrs.
7 Heat slowly to 100 and maintain for 30 mins
8 Heat resin to 225° C. and hold at 225° C., Monitor AV and Viscosity every 1 Hr
9 Maintain resin at 225° C. until AV<15
10 When AV<15 apply Vacuum; Maintain at 225 C and ca. 325 mm until AV<5
11 Cool Resin to about 150° C.; Filter and Package The final resin had the following properties: Acid Value (AV) 2.1, Hydroxyl Number (OHN) 115.6, Mn 1400, Mw 16900, and Viscosity at 25° C. 1123 cps.

Example 3

Preparation of Bio-Based Polyester Resin

| Item | Monomer/Intermediate | Charge (g) |
| --- | --- | --- |
| 1 | Soybean Oil (Pure Vegetable Oil) | 2048.30 |
| 2 | Maleic Anhydride | 247.92 |
| 3 | Diethylene Glycol | 672.36 |
| 4 | Pentaerythritol | 0.86 |
| 5 | Adipic Acid | 164.92 |
| 6 | FASCAT 9100 (Hydroxybutyltin oxide) | 0.45 |

1 Charge Items 1-2 to vessel at Ambient Temperature (25-30° C.)
2 Heat resin to 225° C. under Nitrogen with stirring
3 Maintain resin at 225° C. for 2 Hours, Monitor AV and viscosity every 1 hr
4 Cool Resin to about 65° C.
5 When Resin is at 85° C. Add Item #4, 5 and 6; Continue cooling to 65° C.
6 When resin is at 65° C. Add Item #3; Maintain at 65-75° C. for 0.50 Hrs.
7 Heat slowly to 100 and maintain for 30 mins.
8 Heat resin to 225° C. and hold at 225° C., Monitor AV and viscosity every 1 hr
9 Maintain resin at 225° C. until AV<15
10 When AV<15 apply Vacuum; Maintain at 225° C. and ca. 325 mm until AV<5
11 Cool Resin to about 150° C.; Filter and Package The final resin had the following properties: Acid Value (AV) 2.5, Hydroxyl Number (OHN) 112, Mn 800, Mw 16950, and Viscosity at 25° C. 1235 cps.

Example 4

Preparation of Bio-Based Polyester Resin

| Item | Monomer/Intermediate | Charge (g) |
| --- | --- | --- |
| 1 | Soybean Oil (Pure Vegetable Oil) | 1861.70 |
| 2 | Maleic Anhydride | 223.91 |
| 3 | Diethylene Glycol | 742.68 |
| 4 | Pentaerythritol | 0.74 |
| 5 | Adipic Acid | 299.78 |
| 6 | FASCAT 9100 (Hydroxybutyltin oxide) | 0.3900 |

1 Charge Items 1-2 to vessel at Ambient Temperature (25-30° C.)
2 Heat resin to 200° C. under Nitrogen with stirring
3 Maintain resin at 200° C. for 2 Hours, Monitor AV and viscosity every 1 hr
4 Cool Resin to about 65° C.
5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100° C. and maintain for 30 mins

8 Heat resin to 225° C. and hold at 225 C, Monitor AV and viscosity every 1 hr

9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 3.0, Hydroxyl Number (OHN) 105, Mn 1350, Mw 19300, and Viscosity at 25° C. 1322 cps.

Example 5

Preparation of Bio-Based Polyester Resin

| Item | Monomer/Intermediate | Charge (g) |
|---|---|---|
| 1 | Soybean Oil (Pure Vegetable Oil) | 2048.10 |
| 2 | Maleic Anhydride | 246.34 |
| 3 | Diethylene Glycol | 673.81 |
| 4 | Pentaerythritol | 0.85 |
| 5 | Adipic Acid | 165.02 |
| 6 | FASCAT 9100 (Hydroxybutyltin oxide) | 0.44 |

1 Charge Items 1-2 to vessel at Ambient Temperature (25-30° C.)

2 Heat resin to 225° C. under Nitrogen with stirring

3 Maintain resin at 225° C. for 2 Hours, Monitor InProcess Viscosity every 1 Hr

4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100 and maintain for 30 mins.

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 2.3, Hydroxyl Number (OHN) 107, Mn 1500, Mw 30300, and Viscosity at 25° C. 1640 cps.

Example 6

Preparation of NCO Terminated Prepolymer Based on Resin 1

| Item | Monomer/Intermediate | Charge (g) |
|---|---|---|
| 1 | 4,4'-MDI (LUPRANATE M) | 326.38 |
| 2 | LUPRANATE MI | 210.80 |
| 3 | Bio-Based Polyester Resin of Example 1 | 511.20 |
| 4 | 85% Phosphoric Acid | 0.25 |

1 Charge Items 1-2 to vessel at Ambient Temperature (25-30° C.)

2 Heat resin to 45-50° C. under Nitrogen with stirring

3 Add Item #3 to resin mixture over a 1.5 Hr Period, Keep resin at 80-85° C.

4 Maintain resin at 80-85° C.; Monitor NCO until NCO<13.3 (Theory 13.14)

5 Add Item #4; Maintain at 80-85° C. for 0.50 Hrs

6 Package under Dry Nitrogen

The final resin had the following properties: 13.01% NCO, Mn 850, Mw 27500, and Viscosity at 25° C. 12293 cps.

Example 7

Preparation of NCO Terminated Prepolymer Based on Resin 1

| Item | Monomer/Intermediate | Charge (g) |
|---|---|---|
| 1 | 4,4'-MDI | 311.45 |
| 2 | LUPRANATE MI | 201.92 |
| 3 | Polyol PPG 1025 | 100.40 |
| 4 | Bio-Based Polyester Resin of Example 1 | 384.55 |
| 5 | 85% Phosphoric Acid | 0.28 |

1 Charge Items 1-2 to vessel at Ambient Temperature (25-30° C.)

2 Heat resin to 45-50° C. under Nitrogen with stirring

3 Add Item #3 to resin mixture over 0.50 hr Period; Maintain at 65-70° C.

4 Add Item #4 to resin mixture over a 1.5 hr Period, keep resin at 85-90° C.

5 Maintain resin at 85-90° C.; Monitor NCO until NCO<13.3 (Theory 13.11)

6 Add Item #5; Maintain at 80-85° C. for 0.50 Hrs

7 Package under Dry Nitrogen

The final resin had the following properties: 13.10% NCO, Mn 850, Mw 17000, and Viscosity at 25° C. 8460 cps.

Example 8

Preparation of NCO Terminated Prepolymer Based on Resin 1

| Item | Monomer/Intermediate | Charge (g) |
|---|---|---|
| 1 | 4,4'-MDI - ISONATE 125M | 322.28 |
| 2 | LUPRANATE MI | 208.79 |
| 3 | Polyol PPG 1025 | 103.43 |
| 4 | VORANOL 220-056N | 53.43 |
| 5 | Bio-Based Polyester Resin of Example 1 | 350.68 |
| 6 | 85% Phosphoric Acid | 0.29 |

1 Charge Items 1-2 to vessel at Ambient Temperature (25-30° C.)

2 Heat resin to 45-50° C. under Nitrogen with stirring

3 Add a mixture of Item #3 and 4 to resin mixture over 0.50 Hr; Maintain at 65-70° C.

4 Add Item #5 to resin mixture over a 1.5 Hr Period, Keep resin at 85-90° C.

5 Maintain resin at 85-90° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.13% NCO, Mn 800, Mw 35150, and Viscosity at 25° C. 6517 cps.

Example 9

Preparation of NCO Terminated Prepolymer Based on Resin 2

| Item | Monomer/Intermediate | Charge (g) |
|---|---|---|
| 1 | 4,4'-MDI - ISONATE 125M | 315.42 |
| 2 | LUPRANATE MI | 204.09 |
| 3 | Polyol PPG 1025 | 101.44 |
| 4 | VORANOL 220-056N | 51.08 |
| 5 | Bio-Based Polyester Resin of Example 2 | 338.66 |
| 6 | 85% Phosphoric Acid | 0.35 |

1 Charge Items 1-2 to vessel at Ambient Temperature (25-30° C.)

2 Heat resin to 60-70° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.18% NCO, Mn 900, Mw 30700, and Viscosity at 25° C. 6837 cps.

Example 10

Preparation of NCO Terminated Prepolymer Based on Resin 2

| Item | Monomer/Intermediate | Charge (g) |
|---|---|---|
| 1 | 4,4'-MDI - ISONATE 125M | 312.43 |
| 2 | LUPRANATE MI | 202.83 |
| 3 | Polyol PPG 1025 | 53.67 |
| 4 | VORANOL 220-056N | 50.65 |
| 5 | Bio-Based Polyester Resin of Example 2 | 392.90 |
| 6 | 85% Phosphoric Acid | 0.31 |

1 Charge Items 1-2 to vessel at Ambient Temperature (25-30° C.)

2 Heat resin to 60-70° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.38% NCO, Mn 900, Mw 36900, and Viscosity at 25° C. 8603 cps.

Example 11

Preparation of NCO Terminated Prepolymer Based on Resin 2

| Item | Monomer/Intermediate | Charge (g) |
|---|---|---|
| 1 | 4,4'-MDI - ISONATE 125M | 313.08 |
| 2 | LUPRANATE MI | 202.38 |
| 3 | Polyol PPG 1025 | 51.25 |
| 4 | VORANOL 220-056N | 101.08 |
| 5 | Bio-Based Polyester Resin of Example 2 | 350.35 |
| 6 | 85% Phosphoric Acid | 0.3034 |

1 Charge Items 1-2 to vessel at Ambient Temperature (25-30° C.)

2 Heat resin to 60-70° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.09% NCO, Mn 750, Mw 12900, and Viscosity at 25° C. 6127 cps.

Example 12

Preparation of NCO Terminated Prepolymer Based on Resin 1

| Item | Monomer/Intermediate | Charge (g) |
|---|---|---|
| 1 | 4,4'-MDI - ISONATE 125M | 312.18 |
| 2 | LUPRANATE MI | 202.33 |
| 3 | Polyol PPG 1025 | 50.28 |
| 4 | VORANOL 220-056N | 100.63 |
| 5 | Bio-Based Polyester Resin of Example 1 | 356.71 |
| 6 | 85% Phosphoric Acid | 0.2915 |

1 Charge Items 1-2 to vessel at Ambient Temperature (25-30° C.)

2 Heat resin to 45-50° C. under Nitrogen with stirring

3 Add a mixture of Item #3 and 4 to resin mixture over 0.50 Hr; Maintain at 65-70° C.

4 Add Item #5 to resin mixture over a 1.5 Hr Period, Keep resin at 85-90° C.

5 Maintain resin at 85-90° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.16% NCO, Mn 800, Mw 13300, and Viscosity at 25° C. 6600 cps.

Example 13

Preparation of NCO Terminated Prepolymer Based on Resin 1

| Item | Monomer/Intermediate | Charge (g) |
|---|---|---|
| 1 | 4,4'-MDI - ISONATE 125M | 360.67 |
| 2 | LUPRANATE MI | 161.55 |
| 3 | Polyol PPG 1025 | 106.44 |
| 4 | VORANOL 220-056N | 53.45 |
| 5 | Bio-Based Polyester Resin of Example 1 | 361.37 |
| 6 | 85% Phosphoric Acid | 0.2535 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.35% NCO, Mn 900, Mw 3750, and Viscosity at 25° C. 8130 cps.

Example 14

Preparation of NCO Terminated Prepolymer Based on Resin 1

| Item | Monomer/Intermediate | Charge (g) |
|---|---|---|
| 1 | 4,4'-MDI - ISONATE 125M | 362.44 |
| 2 | LUPRANATE MI | 152.09 |
| 3 | Polyol PPG 1025 | 50.62 |
| 4 | VORANOL 220-056N | 102.17 |
| 5 | Bio-Based Polyester Resin of Example 1 | 353.31 |
| 6 | 85% Phosphoric Acid | 0.2402 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.78% NCO, Mn 650, Mw 1800, and Viscosity at 25° C. 6483 cps.

Example 15

Preparation of NCO Terminated Prepolymer Based on Resin 3

| Item | Monomer/Intermediate | Charge (g) |
|---|---|---|
| 1 | 4,4'-MDI - ISONATE 125M | 315.30 |
| 2 | LUPRANATE MI | 202.51 |
| 3 | Polyol PPG 1025 | 100.33 |
| 4 | VORANOL 220-056N | 52.73 |
| 5 | Bio-Based Polyester Resin of Example 3 | 341.20 |
| 6 | 85% Phosphoric Acid | 0.2898 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.73% NCO and Viscosity at 25° C. 7170 cps.

Example 16

Preparation of NCO Terminated Prepolymer Based on Resin 3

| Item | Monomer/Intermediate | Charge (g) |
|---|---|---|
| 1 | 4,4'-MDI - ISONATE 125M | 311.78 |
| 2 | LUPRANATE MI | 201.97 |
| 3 | Polyol PPG 1025 | 50.28 |
| 4 | VORANOL 220-056N | 102.16 |
| 5 | Bio-Based Polyester Resin of Example 3 | 352.52 |
| 6 | 85% Phosphoric Acid | 0.2734 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.56% NCO and Viscosity at 25° C. 6580 cps.

Example 17

Preparation of NCO Terminated Prepolymer Based on Resin 3

| Item | Monomer/Intermediate | Charge (g) |
| --- | --- | --- |
| 1 | 4,4'-MDI - ISONATE 125M | 361.05 |
| 2 | LUPRANATE MI | 152.13 |
| 3 | Polyol PPG 1025 | 100.78 |
| 4 | VORANOL 220-056N | 51.97 |
| 5 | Bio-Based Polyester Resin of Example 3 | 340.51 |
| 6 | 85% Phosphoric Acid | 0.2739 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.38% NCO and Viscosity at 25° C. 7033 cps.

Example 18

Preparation of NCO Terminated Prepolymer Based on Resin 3

| Item | Monomer/Intermediate | Charge (g) |
| --- | --- | --- |
| 1 | 4,4'-MDI - ISONATE 125M | 365.43 |
| 2 | LUPRANATE MI | 153.74 |
| 3 | Polyol PPG 1025 | 51.11 |
| 4 | VORANOL 220-056N | 101.83 |
| 5 | Bio-Based Polyester Resin of Example 3 | 357.34 |
| 6 | 85% Phosphoric Acid | 0.2907 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.46% NCO and Viscosity at 25° C. 6833 cps.

Example 19

Preparation of NCO Terminated Prepolymer Based on Resin 5

| Item | Monomer/Intermediate | Charge (g) |
| --- | --- | --- |
| 1 | 4,4'-MDI - ISONATE 125M | 361.70 |
| 2 | LUPRANATE MI | 153.50 |
| 3 | VORANOL 1010L Polyol | 100.49 |
| 4 | VORANOL P400 Polyol | 50.39 |
| 5 | Bio-Based Polyester Resin of Example 5 | 321.52 |
| 6 | 85% Phosphoric Acid | 0.3814 |

1 Charge Items 1-2 to vessel at Ambient Temperature (25-30° C.)

2 Heat resin to 45-50° C. under Nitrogen with stirring

3 Add a mixture of Item #3 and 4 to resin mixture over 0.50 Hr; Maintain at 65-70° C.

4 Add Item #5 to resin mixture over a 1.5 Hr Period, Keep resin at 85-90° C.

5 Maintain resin at 85-90° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.51% NCO.

Example 20

Preparation of NCO Terminated Prepolymer Based on Resin 5

| Item | Monomer/Intermediate | Charge (g) |
| --- | --- | --- |
| 1 | 4,4'-MDI - ISONATE 125M | 519.68 |
| 2 | VORANOL 1010L Polyol | 100.51 |
| 3 | VORANOL P400 Polyol | 50.35 |
| 4 | Bio-Based Polyester Resin of Example 5 | 319.49 |
| 5 | 85% Phosphoric Acid | 0.3870 |

1 Charge Item 1 to vessel at Ambient Temperature (25-30° C.)

2 Heat resin to 45-50° C. under Nitrogen with stirring

3 Add a mixture of Item #2 and 3 to resin mixture over 0.50 Hr; Maintain at 65-70° C.

4 Add Item #4 to resin mixture over a 1.5 Hr Period, Keep resin at 85-90° C.

5 Maintain resin at 85-90° C.; Monitor NCO until NCO<13.3 (Theory 13.10)

6 Add Item #5; Maintain at 80-85° C. for 0.50 Hrs

7 Package under Dry Nitrogen

The final resin had the following properties: 12.86% NCO and Viscosity at 25° C. 13983 cps.

Example 21

Preparation of NCO Terminated Prepolymer Based on Resin 5

| Item | Monomer/Intermediate | Charge (g) |
|---|---|---|
| 1 | 4,4'-MDI - ISONATE 125M | 515.17 |
| 2 | VORANOL 1010L Polyol | 51.01 |
| 3 | VORANOL P400 Polyol | 50.97 |
| 4 | Bio-Based Polyester Resin of Example 5 | 368.47 |
| 5 | 85% Phosphoric Acid | 0.3669 |

1 Charge Item 1 to vessel at Ambient Temperature (25-30° C.)

2 Heat resin to 45-50° C. under Nitrogen with stirring

3 Add a mixture of Item #2 and 3 to resin mixture over 0.50 Hr; Maintain at 65-70° C.

4 Add Item #4 to resin mixture over a 1.5 Hr Period, Keep resin at 85-90° C.

5 Maintain resin at 85-90° C.; Monitor NCO until NCO<13.3 (Theory 13.10)

6 Add Item #5; Maintain at 80-85° C. for 0.50 Hrs

7 Package under Dry Nitrogen

The final resin had the following properties: 13.14% NCO.

Example 22

Preparation of NCO Terminated Prepolymer Based on Resin 5

| Item | Monomer/Intermediate | Charge (g) |
|---|---|---|
| 1 | 4,4'-MDI - ISONATE 125M | 361.80 |
| 2 | DESMODUR 2460 M | 153.88 |
| 3 | VORANOL 1010L Polyol | 100.62 |
| 4 | VORANOL 2000L Polyol | 50.36 |
| 5 | Bio-Based Polyester Resin of Example 5 | 368.60 |
| 6 | 85% Phosphoric Acid | 0.4049 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 12.10% NCO and Viscosity at 25° C. 15953 cps.

Example 23

Preparation of NCO Terminated Prepolymer Based on Resin 5

| Item | Monomer/Intermediate | Charge (g) |
|---|---|---|
| 1 | 4,4'-MDI - ISONATE 125M | 312.08 |
| 2 | DESMODUR 2460 M | 202.41 |
| 3 | VORANOL 1010L Polyol | 50.83 |
| 4 | VORANOL 2000L Polyol | 100.65 |
| 5 | Bio-Based Polyester Resin of Example 5 | 354.70 |
| 6 | 85% Phosphoric Acid | 0.4279 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.50 Hr; Maintain at 75-85° C.

4 Add Item #5 to resin mixture over a 1.5 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.37% NCO and Viscosity at 25° C. 11920 cps.

Example 24

Preparation of NCO Terminated Prepolymer Based on Resin 4

| Item | Monomer/Intermediate | Charge (g) |
|---|---|---|
| 1 | 4,4'-MDI - ISONATE 125M | 322.75 |
| 2 | DESMODUR 2460 M | 208.88 |
| 3 | VORANOL 1010L Polyol | 103.53 |
| 4 | VORANOL 2000L Polyol | 54.74 |
| 5 | Bio-Based Polyester Resin of Example 4 | 353.10 |
| 6 | 85% Phosphoric Acid | 0.3113 |

1 Charge Items 1-2 to vessel at Ambient Temperature (25-30° C.)

2 Heat resin to 55-65° C. under Nitrogen with stirring

3 Add a mixture of Item #3 and 4 to resin mixture over 0.25 Hr; Maintain at 75-85° C.

4 Add Item #5 to resin mixture over a 1.0 Hr Period, Keep resin at 85-95° C.

5 Maintain resin at 85-95° C.; Monitor NCO until NCO<13.3 (Theory 13.10)

6 Add Item #6; Maintain at 80-85° C. for 0.50 Hrs

7 Package under Dry Nitrogen

The final resin had the following properties: 13.40% NCO and Viscosity at 25° C. 6563 cps Example 25

Preparation of Bio-Based Polyester Resin

| Item | Monomer/Intermediate | Charge (g) |
|---|---|---|
| 1 | Soybean Oil (Pure Vegetable Oil) | 1230.10 |
| 2 | Maleic Anhydride | 176.73 |
| 3 | Diethylene Glycol | 580.30 |
| 4 | Pentaerythritol | 0.71 |
| 5 | Phthalic Anhydride | 102.45 |
| 6 | FASCAT 4100 (Hydroxybutyltin oxide) | 0.3190 |

1 Charge Items 1-2 to vessel at Ambient Temperature (25-30° C.)

2 Heat resin to 225° C. under Nitrogen with stirring

3 Maintain resin at 225° C. for 2 Hours, Monitor In-Process Viscosity every 1 Hr 4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100° C. and maintain for 30 mins

8 Heat resin to 225° C. and hold at 225° C., Monitor AV and Viscosity every 1 Hr 9 Maintain resin at 225 C until AV<15

10 When AV<15 apply Vacuum; Maintain at 225° C. and ca. 400 mm until AV<3.0

11 Cool Resin to about 150° C.; Filter and Package

The final resin had the following properties: Acid Value (AV) 1.7, Hydroxyl Number (OHN) 176, Mn 1300, Mw 8100, and Viscosity at 25° C. 1130 cps.

Example 26

Preparation of Bio-Based Polyester Blend

| Item | Monomer/Intermediate | Charge (g) |
|---|---|---|
| 1 | Bio-Based Polyester Resin of Example 25 | 3674.50 |
| 2 | 85% Phosphoric Acid | 2.1506 |
| 3 | Deionized Water | 4.0932 |

1 Charge Item 1 to 5-Liter Reactor; Nitrogen/Vacuum Degas Resin

2 Slowly add with stirring Item 2 and 3 to Item 1

3 Heat to 52° C. and mix for 1 hr

4 Filter and Package

The final resin had the following properties: Acid Value (AV) 2.9, Hydroxyl Number (OHN) 180, Mn 1250, Mw 5950, and Viscosity at 25° C. 1130 cps.

Example 27

Preparation of Bio-Based Polyester Blend

| Item | Monomer/Intermediate | Charge (g) |
|---|---|---|
| 1 | Bio-Based Polyester Resin of Example 26 | 505.43 |
| 2 | VORANOL CP 450 Polyol | 217.64 |

1 Charge Item 1 to glass bottle

2 Slowly add with stirring Item 2 to Item 1

3 Mix on Rolling mill for 1 Hr.; Warm resin to 56° C.; Mix for additional 1 Hr

The final resin had the following properties: Acid Value (AV) 2.7, Hydroxyl Number (OHN) 244, Mn 750, Mw 4300, and Viscosity at 25° C. 772 cps.

Example 28

Preparation of Bio-Based Polyester Blend

| Item | Monomer/Intermediate | Charge (g) |
|---|---|---|
| 1 | Bio-Based Polyester Resin of Example 26 | 537.43 |
| 2 | Trimethylolpropane | 8.25 |

1 Charge Item 1 to glass bottle

2 Slowly add with stirring Item 2 to Item 1

3 Mix on Rolling mill for 2 hrs.

The final resin had the following properties: Acid Value (AV) 3.0, Hydroxyl Number (OHN) 198.3, Mn 1250, Mw 6300, and Viscosity at 25° C. 1249 cps.

Example A

Preparation of Bio-Based Polyester Resin

| Item | Monomer/Intermediate | Charge (g) |
|---|---|---|
| 1 | Soybean Oil (Pure Vegetable Oil) | 1226.40 |
| 2 | Maleic Anhydride | 157.00 |
| 3 | Diethylene Glycol | 416.00 |
| 4 | Pentaerythritol | 0.45 |
| 5 | Phthalic Anhydride | 1.00 |
| 6 | FASCAT 9100 (Hydroxybutyltin oxide) | 0.25 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 1.5, Hydroxyl Number (OHN) 156, Mn 1700, Mw 14150, and Viscosity at 25° C. 905 cps.

Example B

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 451.60 |
| 4 | Pentaerythritol | 0.45 |
| 5 | Phthalic Anhydride | 1.00 |
| 6 | FASCAT 9100 (Hydroxybutyltin oxide) | 0.25 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) <1.0, Hydroxyl Number (OHN) 179, Mn 1150, Mw 9000, and Viscosity at 25° C. 686 cps.

Example C

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 392.80 |
| 4 | Pentaerythritol | 0.45 |
| 5 | Phthalic Anhydride | 1.00 |
| 6 | FASCAT 9100 (Hydroxybutyltin oxide) | 0.25 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) <1.0, Hydroxyl Number (OHN) 146, and Viscosity at 25° C. 982 cps.

Example D

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 350.60 |
| 4 | Pentaerythritol | 0.45 |
| 5 | Phthalic Anhydride | 1.00 |
| 6 | FASCAT 9100 (Hydroxybutyltin oxide) | 0.25 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5 and 6; Continue cooling to 65° C.

6 When resin is at 65° C. Add Item #3; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 2.8, Hydroxyl Number (OHN) 123, Mn 1250, Mw 28650, and Viscosity at 25° C. 1695 cps.

Example E

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 400.00 |
| 4 | Pentaerythritol | 0.45 |
| 5 | Phthalic Anhydride | 1.00 |
| 6 | FASCAT 9100 (Hydroxybutyltin oxide) | 0.25 |
| 7 | Benzoic Acid | 40.00 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5, 6 and 7; Continue cooling to 65° C.

6 When resin is at 65° C. Add Item #3; Maintain at 65-75° C. for 0.50 Hrs.

7 Heat slowly to 100 and maintain for 30 mins.

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 1.7, Hydroxyl Number (OHN) 140, Mn 1150, Mw 18200, and Viscosity at 25° C. 1150 cps.

Example F

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 400.00 |
| 4 | Pentaerythritol | 0.45 |
| 5 | Phthalic Anhydride | 1.00 |
| 6 | FASCAT 9100 (Hydroxybutyltin oxide) | 0.25 |
| 7 | Benzoic Acid | 40.00 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #4, 5, 6 and 7; Continue cooling to 65° C.

6 When resin is at 65° C. Add Item #3; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 2.4, Hydroxyl Number (OHN) 133, Mn 1200, Mw 21250, and Viscosity at 25° C. 924 cps.

Example G

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 388.00 |
| 4 | Ethanolamine | 6.50 |
| 5 | FASCAT 9100 (Hydroxybutyltin oxide) | 0.20 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #5; Continue cooling to 65° C.

6 When resin is at 65° C. Add Item #3 and 4; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5

11 Cool Resin to about 150° C.; Filter and Package

The final resin had the following properties: Acid Value (AV) 1.2, Hydroxyl Number (OHN) 148, and Viscosity at 25° C. 1189 cps.

Example H

Preparation of Bio-Based Polyester Resin

| Item | Monomer/Intermediate | Charge (g) |
| --- | --- | --- |
| 1 | Soybean Oil (Pure Vegetable Oil) | 1226.40 |
| 2 | Maleic Anhydride | 157.00 |
| 3 | Diethylene Glycol | 294.30 |
| 4 | Ethanolamine | 20.00 |
| 5 | FASCAT 9100 (Hydroxybutyltin oxide) | 0.20 |

1 Charge Items 1-2 to vessel at Ambient Temperature (25-30° C.)

2 Heat resin to 225° C. under Nitrogen with stirring

3 Maintain resin at 225° C. for 2 Hours, Monitor AV and viscosity every 1 hr

4 Cool Resin to about 65° C.

5 When Resin is at 85° C. Add Item #5; Continue cooling to 65° C.

6 When resin is at 65° C. Add Item #3 and 4; Maintain at 65-75° C. for 0.50 Hrs.

7 Heat slowly to 100 and maintain for 30 mins

8 Heat resin to 225° C. and hold at 225° C., Monitor AV and viscosity every 1 hr 9 Maintain resin at 225° C. until AV<15

10 When AV<15 apply Vacuum; Maintain at 225° C. and ca. 325 mm until AV<5
11 Cool Resin to about 150° C.; Filter and Package The final resin had the following properties: Acid Value (AV) 1.1, Hydroxyl Number (OHN) 109, Mn 1400, Mw 26200, and Viscosity at 25° C. 1390 cps.

Example I

Preparation of NCO Terminated Prepolymer Based on Resin A

| Item | Monomer/Intermediate | Charge (g) |
|---|---|---|
| 1 | 4,4'-MDI - ISONATE 125M | 132.84 |
| 2 | LUPRANATE MI | 204.36 |
| 3 | Bio-Based Polyester Resin of Example A | 262.80 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen The final resin had the following properties: 12.95% NCO and Viscosity at 25° C. 26100 cps

Example J

Preparation of NCO Terminated Prepolymer Based on Resin B

| Item | Monomer/Intermediate | Charge (g) |
|---|---|---|
| 1 | 4,4'-MDI - ISONATE 125M | 128.20 |
| 2 | LUPRANATE MI | 198.18 |
| 3 | Bio-Based Polyester Resin of Example B | 273.00 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen The final resin had the following properties: 12.96% NCO and Viscosity at 25° C. 27870 cps

Example K

Preparation of NCO Terminated Prepolymer Based on Resin D

| Item | Monomer/Intermediate | Charge (g) |
|---|---|---|
| 1 | 4,4'-MDI - ISONATE 125M | 122.70 |
| 2 | MONDUR ML | 188.70 |
| 3 | Bio-Based Polyester Resin of Example D | 288.60 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen The final resin had the following properties: 12.98% NCO and Viscosity at 25° C. 44840 cps

Example L

Preparation of NCO Terminated Prepolymer Based on Resin E

| Item | Monomer/Intermediate | Charge (g) |
|---|---|---|
| 1 | 4,4'-MDI - ISONATE 125M | 126.06 |
| 2 | MONDUR ML | 193.74 |
| 3 | Bio-Based Polyester Resin of Example E | 280.20 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen The final resin had the following properties: 12.96% NCO and Viscosity at 25° C. 26850 cps

Example M

Preparation of NCO Terminated Prepolymer Based on Resin F

| Item | Monomer/Intermediate | Charge (g) |
|---|---|---|
| 1 | 4,4'-MDI - ISONATE 125M | 124.62 |
| 2 | MONDUR ML | 191.58 |
| 3 | Bio-Based Polyester Resin of Example F | 283.80 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen 6 The final resin had the following properties: 12.94% NCO and Viscosity at 25° C. 17600 cps

Example N

Preparation of NCO Terminated Prepolymer Based on Resin F

| Item | Monomer/Intermediate | Charge (g) |
| --- | --- | --- |
| 1 | 4,4'-MDI - ISONATE 125M | 135.48 |
| 2 | MONDUR ML | 208.32 |
| 3 | Bio-Based Polyester Resin of Example F | 256.20 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen
The final resin had the following properties: 14.97% NCO and Viscosity at 25° C. 5747 cps

Example O

Preparation of NCO Terminated Prepolymer Based on Resin C

| Item | Monomer/Intermediate | Charge (g) |
| --- | --- | --- |
| 1 | 4,4'-MDI - ISONATE 125M | 127.14 |
| 2 | MONDUR ML | 195.66 |
| 3 | Bio-Based Polyester Resin of Example C | 277.20 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
3 Maintain resin at 80° C. for 1.0 Hr.
4 Package under Dry Nitrogen
The final resin had the following properties: 12.95% NCO and Viscosity at 25° C. 35230 cps

Example P

Preparation of NCO Terminated Prepolymer Based on Resin G

| Item | Monomer/Intermediate | Charge (g) |
| --- | --- | --- |
| 1 | 4,4'-MDI - ISONATE 125M | 127.44 |
| 2 | MONDUR ML | 195.96 |
| 3 | Bio-Based Polyester Resin of Example G | 276.60 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen
6 The final resin had the following properties: 13.00% NCO and Viscosity at 25° C. 25730 cps

Example Q

Preparation of NCO Terminated Prepolymer Based on Resin H

| Item | Monomer/Intermediate | Charge (g) |
| --- | --- | --- |
| 1 | 4,4'-MDI - ISONATE 125M | 119.88 |
| 2 | LUPRANATE MI | 184.32 |
| 3 | Bio-Based Polyester Resin of Example H | 295.80 |

1 Charge Items 1-2 to vessel at Ambient Temperature (25-30° C.)
2 Heat resin to 35° C. under Nitrogen with stirring
3 Add Item #3 to resin mixture over 1.00 Hr; Maintain at 80° C.
4 Maintain resin at 80° C. for 1.0 Hr.
5 Package under Dry Nitrogen
The final resin had the following properties: 13.01% NCO and Viscosity at 25° C. 12750 cps The adhesion properties of the Isocyanate Terminated Bio-Based Prepolymer resins were evaluated with bio-based polyesters using a series of laminate constructions. These two part adhesive systems were first screened via a solvent hand casting method and then utilizing a solventless coating method for select systems on a PolyType Solventless Coater/Laminator.

Example 29

Isocyanate Terminated Prepolymer of Example 7 was evaluated with Polyester of Example 27 at a mix ratio of 100:50 from a 50% ethyl acetate solution to yield a coating weight of 1.63 g/m$^2$. The bond strength was examined as a function of curing time and is reported below.

| Laminate Structure | Bond Strength (N/15 mm) | |
| --- | --- | --- |
|  | 1 Day | 7 Day |
| Polyester/Polyethylene | 3.70 ftr | 7.20 ftr |
| Nylon/Polyethylene | 5.26 ftr | 5.24 ftr |
| CoexPP-Met/CoexPP (MB400) (a) | 1.22 pmt/as | 1.87 pmt/as |
| OPP (MB200)/OPP (MB200) (b) | 2.59 ftr | 3.03 ftr |
| CoexPP/OPP (MB200) | 3.14 ftr | 3.38 ftr |
| CoexPP-Met/CoexPP (70 SPW)(c) | 1.10 pmt/as | 1.99 pmt/as |
| CoexPP (125 BSR-ONE)/OPP (MB200) | 3.48 ftr | 3.41 ftr |
| CoexPP-Met/CoexPP (125 BSR-ONE)(d) | 1.08 pmt/as | 2.50 pmt/as |

(a) CoexPP-Met/CoexPP (MB400): Coextruded Polypropylene - Metallized/Coextruded Polypropylene (MB400)
(b) OPP(MB200)/OPP (MB200): Oriented Polypropylene (MB200)/Oriented Polypropylene (MB200)
(c)CoexPP-Met/CoexPP (70 SPW): Coextruded Polypropylene - Metallized/Coextruded Polypropylene (70 SPW)
(d)CoexPP-Met/CoexPP (125BSR-ONE): Coextruded Polypropylene - Metallized/Coextruded Polypropylene (125BSR-ONE)
as: Adhesive Split
ftr: Film Tear
pmt: Partial Metal Transfer
sec: Adhesive on Secondary Film
zip: Zippery bond

Example 30

Isocyanate Terminated Bio-Based Prepolymer of Example 7 was evaluated with Bio-Based Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.76 ftr | 3.19 ftr |
| Nylon/Polyethylene | 6.26 ftr | 2.95 ftr |
| CoexPP-Met/CoexPP (MB400) | 1.12 pmt/as | 1.87 pmt/as |
| OPP (MB200)/OPP (MB200) | 1.17 ftr | 1.23 ftr |
| CoexPP/OPP (MB200) | 3.27 ftr | 3.16 ftr |
| CoexPP-Met/CoexPP (70 SPW) | 1.32 pmt/as | 1.85 pmt/as |
| CoexPP (125 BSR-ONE)/OPP (MB200) | 3.05 ftr | 3.00 ftr |
| CoexPP-Met/CoexPP (125 BSR-ONE) | 1.27 pmt/as | 2.03 pmt/as |

Example 31

Isocyanate Terminated Prepolymer of Example 7 was evaluated with Polyester of Example 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 5.25 ftr | 2.50 ftr |
| Nylon/Polyethylene | 8.88 ftr | 3.79 ftr |
| CoexPP-Met/CoexPP (MB400) | 1.51 as | 1.61 pmt/as |
| OPP (MB200)/OPP (MB200) | 4.72 ftr | 2.59 ftr |
| CoexPP/OPP (MB200) | 5.35 ftr | 1.54 ftr |
| CoexPP-Met/CoexPP (70 SPW) | 0.86 as | 1.08 pmt/as |
| CoexPP (125 BSR-ONE)/OPP (MB200) | 5.80 ftr | 3.38 ftr |
| CoexPP-Met/CoexPP (125 BSR-ONE) | 1.16 as | 1.60 pmt/as |

Example 32

Isocyanate Terminated Prepolymer of Example 7 was evaluated with Polyester of Example 28 at a mix ratio of 100:60 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 5.32 ftr | 3.59 ftr |
| Nylon/Polyethylene | 9.76 ftr | 6.25 ftr |
| CoexPP-Met/CoexPP (MB400) | 1.48 as | 1.47 pmt/as |
| OPP (MB200)/OPP (MB200) | 5.01 ftr | 2.63 ftr |
| CoexPP/OPP (MB200) | 4.61 ftr | 3.11 ftr |
| CoexPP-Met/CoexPP (70 SPW) | 0.87 as | 1.31 pmt/as |
| CoexPP (125 BSR-ONE)/OPP (MB200) | 5.82 ftr | 3.42 ftr |
| CoexPP-Met/CoexPP (125 BSR-ONE) | 1.42 as | 1.48 pmt/as |

Example 33

Isocyanate Terminated Bio-Based Prepolymer of Example 8 was evaluated with Bio-Based Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.67 ftr | 5.02 ftr |
| Nylon/Polyethylene | 4.22 ftr | 5.16 ftr |
| CoexPP-Met/CoexPP (MB400) | 0.86 pmt/as | 1.96 pmt/as |
| OPP (MB200)/OPP (MB200) | 2.36 ftr | 3.20 ftr |
| CoexPP/OPP (MB200) | 3.07 ftr | 3.45 ftr |
| CoexPP-Met/CoexPP (70 SPW) | 1.27 pmt/as | 2.08 pmt/as |
| CoexPP (125 BSR-ONE)/OPP (MB200) | 3.24 ftr | 3.07 ftr |
| CoexPP-Met/CoexPP (125 BSR-ONE) | 1.34 pmt/as | 2.92 pmt/as |

Example 34

Isocyanate Terminated Bio-Based Prepolymer of Example 8 was evaluated with Bio-Based Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.05 ftr | 4.90 ftr |
| Nylon/Polyethylene | 3.54 ftr | 5.43 ftr |
| CoexPP-Met/CoexPP (MB400) | 1.36 pmt/as | 2.28 pmt/as |
| OPP (MB200)/OPP (MB200) | 1.97 ftr | 1.87 ftr |
| CoexPP/OPP (MB200) | 3.13 ftr | 3.04 ftr |
| CoexPP-Met/CoexPP (70 SPW) | 1.22 pmt/as | 2.46 pmt/as |
| CoexPP (125 BSR-ONE)/OPP (MB200) | 2.86 ftr | 2.75 ftr |
| CoexPP-Met/CoexPP (125 BSR-ONE) | 0.93 pmt/as | 2.69 pmt/as |

Example 35

Isocyanate Terminated Prepolymer of Example 8 was evaluated with Polyester of Example 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 4.84 ftr | 3.85 ftr |
| Nylon/Polyethylene | 6.25 ftr | 4.04 ftr |
| CoexPP-Met/CoexPP (MB400) | 0.88 pmt/as | 1.53 pmt/as |
| OPP (MB200)/OPP (MB200) | 3.80 ftr | 3.05 ftr |
| CoexPP/OPP (MB200) | 3.95 ftr | 2.88 ftr |
| CoexPP-Met/CoexPP (70 SPW) | 2.17 pmt/as | 2.05 pmt/as |
| CoexPP (125 BSR-ONE)/OPP (MB200) | 3.95 ftr | 3.53 ftr |
| CoexPP-Met/CoexPP (125 BSR-ONE) | 0.78 pmt/as | 1.78 pmt/as |

Example 36

Isocyanate Terminated Prepolymer of Example 8 was evaluated with Polyester of Example 28 at a mix ratio of 100:60 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 4.64 ftr | 3.97 ftr |
| Nylon/Polyethylene | 7.24 ftr | 5.31 ftr |
| CoexPP-Met/CoexPP (MB400) | 1.24 as | 1.91 pmt/as |
| OPP (MB200)/OPP (MB200) | 3.67 ftr | 3.57 ftr |
| CoexPP/OPP (MB200) | 3.83 ftr | 3.26 ftr |
| CoexPP-Met/CoexPP (70 SPW) | 1.36 as | 1.94 pmt/as |
| CoexPP (125 BSR-ONE)/OPP (MB200) | 3.61 ftr | 2.90 ftr |
| CoexPP-Met/CoexPP (125 BSR-ONE) | 0.89 as | 1.78 pmt/as |

Example 37

Isocyanate Terminated Prepolymer of Example 9 was evaluated with Polyester of Example 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Days |
| Polyester/Polyethylene | 3.05 ftr | 6.03 ftr |
| Nylon/Polyethylene | 3.62 ftr | 4.16 ftr |
| CoexPP-Met/CoexPP (MB400) | 1.08 as | 2.13 pmt/as |
| OPP (MB200)/OPP (MB200) | 1.92 ftr | 2.46 ftr |
| CoexPP/OPP (MB200) | 2.22 ftr | 1.99 ftr |
| CoexPP-Met/CoexPP (70 SPW) | 0.90 as | 1.90 pmt/as |
| CoexPP (125 BSR-ONE)/OPP (MB200) | 2.48 ftr | 3.56 ftr |
| CoexPP-Met/CoexPP (125 BSR-ONE) | 0.55 as | 2.13 pmt/as |

Example 38

Isocyanate Terminated Prepolymer of Example 9 was evaluated with Polyester of Example 27 at a mix ratio of 100:55 from a 50% Ethyl Acetate solution to yield a coating weight of 1.63 g/m2. The bond strength was examined as a function of curing time and is reported below.

| Laminate Structure | Bond Strength (N/15 mm) | |
|---|---|---|
| | 1 Day | 7 Day |
| Polyester/Polyethylene | 2.84 ftr | 4.50 ftr |
| Nylon/Polyethylene | 3.25 ftr | 3.99 ftr |
| CoexPP-Met/CoexPP (MB400) | 0.65 as | 1.51 pmt/as |
| OPP (MB200)/OPP (MB200) | 1.68 ftr | 2.01 ftr |
| CoexPP/OPP (MB200) | 1.85 ftr | 2.03 ftr |
| CoexPP-Met/CoexPP (70 SPW) | 0.85 as | 1.58 pmt/as |
| CoexPP (125 BSR-ONE)/OPP (MB200) | 2.06 ftr | 3.09 ftr |
| CoexPP-Met/CoexPP (125 BSR-ONE) | 0.74 as | 2.10 pmt/as |

Example 39

Isocyanate Terminated Prepolymer of Example 9 was evaluated with Polyester of Example 28 at a mix ratio of 100:55 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.18 as | 3.57 ftr |
| Nylon/Polyethylene | 2.57 as | 2.29 ftr |
| CoexPP-Met/CoexPP (MB400) | 0.64 as | 1.37 pmt/as |
| OPP (MB200)/OPP (MB200) | 0.88 as | 1.68 ftr |
| CoexPP/OPP (MB200) | 1.13 as | 3.39 ftr |
| CoexPP-Met/CoexPP (70 SPW) | 0.70 as | 1.71 pmt/as |
| CoexPP (125 BSR-ONE)/OPP (MB200) | 0.86 as | 3.86 ftr |
| CoexPP-Met/CoexPP (125 BSR-ONE) | 0.45 as | 1.74 pmt/as |

Example 40

Isocyanate Terminated Prepolymer of Example 9 was evaluated with Polyester of Example 28 at a mix ratio of 100:60 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 1.87 as | 3.00 ftr |
| Nylon/Polyethylene | 2.30 as | 2.05 ftr |
| CoexPP-Met/CoexPP (MB400) | 0.64 as | 1.20 pmt/as |
| OPP (MB200)/OPP (MB200) | 0.77 as | 1.43 ftr |
| CoexPP/OPP (MB200) | 0.50 as | 2.88 ftr |
| CoexPP-Met/CoexPP (70 SPW) | 0.71 as | 1.07 pmt/as |
| CoexPP (125 BSR-ONE)/OPP (MB200) | 0.68 as | 3.33 ftr |
| CoexPP-Met/CoexPP (125 BSR-ONE) | 0.45 as | 1.00 pmt/as |

Example 41

Isocyanate Terminated Prepolymer of Ex. 10 was evaluated with Polyester of Ex. 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.81 ftr | 1.84 ftr |
| Nylon/Polyethylene | 1.62 ftr | 1.38 ftr |
| CoexPP-Met/CoexPP (MB400) | 0.94 as | 1.27 pmt/as |
| OPP (MB200)/OPP (MB200) | 1.98 ftr | 1.89 ftr |
| CoexPP/OPP (MB200) | 2.58 ftr | 2.03 ftr |
| CoexPP-Met/CoexPP (70 SPW) | 0.84 as | 1.44 pmt/as |
| CoexPP (125 BSR-ONE)/OPP (MB200) | 3.13 ftr | 3.01 ftr |
| CoexPP-Met/CoexPP (125 BSR-ONE) | 0.53 as | 1.59 pmt/as |

Example 42

Isocyanate Terminated Prepolymer of Ex. 10 was evaluated with Polyester of Ex. 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.97 ftr | 2.69 ftr |
| Nylon/Polyethylene | 1.25 ftr | 1.43 ftr |
| CoexPP-Met/CoexPP (MB400) | 0.88 as | 1.68 pmt/as |
| OPP (MB200)/OPP (MB200) | 1.97 ftr | 2.03 ftr |
| CoexPP/OPP (MB200) | 2.84 ftr | 2.75 ftr |
| CoexPP-Met/CoexPP (70 SPW) | 0.89 as | 1.98 pmt/as |
| CoexPP (125 BSR-ONE)/OPP (MB200) | 3.42 ftr | 3.20 ftr |
| CoexPP-Met/CoexPP (125 BSR-ONE) | 0.51 as | 1.70 pmt/as |

Example 43

Isocyanate Terminated Prepolymer of Example 10 was evaluated with Polyester of Example 27 at a mix ratio of 100:60 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.07 ftr | 2.83 ftr |
| Nylon/Polyethylene | 1.97 ftr | 1.82 ftr |
| CoexPP-Met/CoexPP (MB400) | 1.00 as | 1.77 pmt/as |
| OPP (MB200)/OPP (MB200) | 1.89 ftr | 1.52 ftr |
| CoexPP/OPP (MB200) | 2.62 ftr | 1.89 ftr |
| CoexPP-Met/CoexPP (70 SPW) | 0.97 as | 1.67 pmt/as |
| CoexPP (125 BSR-ONE)/OPP (MB200) | 3.26 ftr | 2.65 ftr |
| CoexPP-Met/CoexPP (125 BSR-ONE) | 0.76 as | 1.67 pmt/as |

Example 44

Isocyanate Terminated Prepolymer of Example 11 was evaluated with Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 5.90 ftr | 3.01 ftr |
| Nylon/Polyethylene | 2.85 ftr | 1.79 ftr |
| CoexPP-Met/CoexPP (MB400) | 1.06 as | 1.57 pmt/as |
| OPP (MB200)/OPP (MB200) | 2.58 ftr | 1.66 ftr |
| CoexPP/OPP (MB200) | 3.15 ftr | 3.40 ftr |
| CoexPP-Met/CoexPP (70 SPW) | 1.13 as | 1.79 pmt/as |
| CoexPP (125 BSR-ONE)/OPP (MB200) | 2.08 ftr | 1.40 ftr |
| CoexPP-Met/CoexPP (125 BSR-ONE) | 0.87 as | 2.19 pmt/as |

Example 45

Isocyanate Terminated Prepolymer of Example 11 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 5.36 ftr | 2.85 ftr |
| Nylon/Polyethylene | 2.94 ftr | 1.51 ftr |
| CoexPP-Met/CoexPP (MB400) | 0.52 as | 1.28 pmt/as |
| OPP (MB200)/OPP (MB200) | 2.81 ftr | 2.06 ftr |
| CoexPP/OPP (MB200) | 3.07 ftr | 2.89 ftr |
| CoexPP-Met/CoexPP (70 SPW) | 0.78 as | 1.90 pmt/as |
| CoexPP (125 BSR-ONE)/OPP (MB200) | 3.27 ftr | 2.47 ftr |
| CoexPP-Met/CoexPP (125 BSR-ONE) | 0.67 as | 2.11 pmt/as |

Example 46

Isocyanate Terminated Prepolymer of Ex. 11 was evaluated with Polyester of Ex. 27 at a mix ratio of 100:60 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 5.91 ftr | 3.15 ftr |
| Nylon/Polyethylene | 3.20 ftr | 1.23 ftr |
| CoexPP-Met/CoexPP (MB400) | 0.81 as | 1.86 pmt/as |
| OPP (MB200)/OPP (MB200) | 3.05 ftr | 1.77 ftr |
| CoexPP/OPP (MB200) | 3.07 ftr | 2.95 ftr |
| CoexPP-Met/CoexPP (70 SPW) | 0.82 as | 1.66 pmt/as |
| CoexPP (125 BSR-ONE)/OPP (MB200) | 3.55 ftr | 3.45 ftr |
| CoexPP-Met/CoexPP (125 BSR-ONE) | 0.81 as | 1.65 pmt/as |

Example 47

Isocyanate Terminated Bio-Based Prepolymer of Ex. 12 was evaluated with Bio-Based Polyester of Ex. 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.05 ftr | 2.59 ftr |
| Nylon/Polyethylene | 5.27 ftr | 3.84 ftr |
| CoexPP-Met/CoexPP (MB400) | 0.98 as | 2.03 pmt/as |
| OPP (MB200)/OPP (MB200) | 2.58 ftr | 1.77 ftr |
| CoexPP/OPP (MB200) | 2.59 ftr | 3.15 ftr |
| CoexPP-Met/CoexPP (70 SPW) | 0.96 as | 1.94 pmt/as |
| CoexPP (125 BSR-ONE)/OPP (MB200) | 2.81 ftr | 3.01 ftr |
| CoexPP-Met/CoexPP (125 BSR-ONE) | 0.59 as | 2.18 pmt/as |

Example 48

Isocyanate Terminated Prepolymer of Example 12 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 2.52 ftr | 3.95 ftr |
| Nylon/Polyethylene | 6.53 ftr | 6.61 ftr |
| CoexPP-Met/CoexPP (MB400) | 0.89 as | 2.00 pmt/as |
| OPP (MB200)/OPP (MB200) | 1.40 ftr | 1.34 ftr |
| CoexPP/OPP (MB200) | 1.10 ftr | 2.31 ftr |
| CoexPP-Met/CoexPP (70 SPW) | 0.80 as | 1.93 pmt/as |
| CoexPP (125 BSR-ONE)/OPP (MB200) | 1.20 ftr | 3.83 ftr |
| CoexPP-Met/CoexPP (125 BSR-ONE) | 0.53 as | 1.84 pmt/as |

Example 49

Isocyanate Terminated Prepolymer of Example 13 was evaluated with Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 5.25 ftr | 2.81 ftr |
| Nylon/Polyethylene | 2.57 ftr | 2.57 ftr |
| CoexPP-Met/CoexPP (MB400) | 0.93 as | 1.58 pmt/as |
| OPP (MB200)/OPP (MB200) | 1.91 ftr | 1.75 ftr |
| CoexPP/OPP (MB200) | 2.70 ftr | 2.62 ftr |
| CoexPP-Met/CoexPP (70 SPW) | 1.04 as | 2.17 pmt/as |
| CoexPP (125 BSR-ONE)/OPP (MB200) | 3.48 ftr | 3.56 ftr |
| CoexPP-Met/CoexPP (125 BSR-ONE) | 0.65 as | 2.04 pmt/as |

Example 50

Isocyanate Terminated Prepolymer of Example 13 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 4.03 ftr | 2.93 ftr |
| Nylon/Polyethylene | 2.10 ftr | 2.97 ftr |
| CoexPP-Met/CoexPP (MB400) | 1.00 as | 1.63 pmt/as |
| OPP (MB200)/OPP (MB200) | 1.83 ftr | 2.18 ftr |
| CoexPP/OPP (MB200) | 2.24 ftr | 2.79 ftr |
| CoexPP-Met/CoexPP (70 SPW) | 0.82 as | 1.84 pmt/as |
| CoexPP (125 BSR-ONE)/OPP (MB200) | 2.97 ftr | 2.55 ftr |
| CoexPP-Met/CoexPP (125 BSR-ONE) | 0.57 as | 1.93 pmt/as |

Example 51

Isocyanate Terminated Prepolymer of E. 13 was evaluated with Polyester of Ex. 27 at a mix ratio of 100:60 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 3.19 ftr | 5.50 ftr |
| Nylon/Polyethylene | 5.19 ftr | 4.94 ftr |
| CoexPP-Met/CoexPP (MB400) | 0.92 as | 2.11 pmt/as |
| OPP (MB200)/OPP (MB200) | 2.98 ftr | 1.91 ftr |
| CoexPP/OPP (MB200) | 3.20 ftr | 3.23 ftr |
| CoexPP-Met/CoexPP (70 SPW) | 1.10 as | 2.31 pmt/as |
| CoexPP (125 BSR-ONE)/OPP (MB200) | 3.64 ftr | 3.65 ftr |
| CoexPP-Met/CoexPP (125 BSR-ONE) | 0.77 as | 2.24 pmt/as |

Example 52

Isocyanate Terminated Bio-Based Prepolymer of Example 14 was evaluated with Bio-Based Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 2.87 ftr | 0.88 ftr |
| Nylon/Polyethylene | 4.13 ftr | 2.59 ftr |
| CoexPP-Met/CoexPP (MB400) | 1.19 as | 2.21 pmt/as |
| OPP (MB200)/OPP (MB200) | 2.61 ftr | 1.72 ftr |
| CoexPP/OPP (MB200) | 2.05 ftr | 2.89 ftr |
| CoexPP-Met/CoexPP (70 SPW) | 1.01 as | 2.01 pmt/as |
| CoexPP (125 BSR-ONE)/OPP (MB200) | 1.53 ftr | 3.16 ftr |
| CoexPP-Met/CoexPP (125 BSR-ONE) | 0.76 as | 2.32 pmt/as |

Example 53

Isocyanate Terminated Prepolymer of Example 14 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
|---|---|---|
| Laminate Structure | 1 Day | 7 Day |
| Polyester/Polyethylene | 2.60 ftr | 3.00 ftr |
| Nylon/Polyethylene | 3.84 ftr | 3.29 ftr |
| CoexPP-Met/CoexPP (MB400) | 0.99 as | 1.77 pmt/as |
| OPP (MB200)/OPP (MB200) | 2.10 ftr | 1.85 ftr |
| CoexPP/OPP (MB200) | 1.92 ftr | 2.28 ftr |
| CoexPP-Met/CoexPP (70 SPW) | 0.85 as | 2.62 pmt/as |
| CoexPP (125 BSR-ONE)/OPP (MB200) | 1.44 ftr | 1.97 ftr |
| CoexPP-Met/CoexPP (125 BSR-ONE) | 0.68 as | 2.07 pmt/as |

Example 54

Isocyanate Terminated Prepolymer of Example 14 was evaluated with Polyester of Example 27 at a mix ratio of 100:60 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 2.42 ftr                | 2.76 ftr   |
| Nylon/Polyethylene                 | 3.72 ftr                | 3.31 ftr   |
| CoexPP-Met/CoexPP (MB400)          | 0.89 as                 | 2.90 pmt/as|
| OPP (MB200)/OPP (MB200)            | 1.88 ftr                | 2.15 ftr   |
| CoexPP/OPP (MB200)                 | 2.22 ftr                | 2.06 ftr   |
| CoexPP-Met/CoexPP (70 SPW)         | 0.80 as                 | 1.86 pmt/as|
| CoexPP (125 BSR-ONE)/OPP (MB200)   | 1.46 ftr                | 1.80 ftr   |
| CoexPP-Met/CoexPP (125 BSR-ONE)    | 1.26 as                 | 2.25 pmt/as|

Example 55

Isocyanate Terminated Prepolymer of Example 15 was evaluated with Polyester of Example 27 at a mix ratio of 100:50 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 3.56 ftr                | 3.01 ftr   |
| Nylon/Polyethylene                 | 6.51 ftr                | 3.39 ftr   |
| CoexPP-Met/CoexPP (MB400)          | 1.74 pmt/as             | 2.20 pmt/as|
| OPP (MB200)/OPP (MB200)            | 3.00 ftr                | 2.07 ftr   |
| CoexPP/OPP (MB200)                 | 2.87 ftr                | 1.84 ftr   |
| CoexPP-Met/CoexPP (70 SPW)         | 1.25 pmt/as             | 2.41 pmt/as|
| CoexPP (125 BSR-ONE)/OPP (MB200)   | 3.88 ftr                | 2.30 ftr   |
| CoexPP-Met/CoexPP (125 BSR-ONE)    | 1.00 pmt/as             | 2.74 pmt/as|

Example 56

Isocyanate Terminated Prepolymer of Example 15 was evaluated with Polyester of Example 27 at a mix ratio of 100:55 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 3.12 ftr                | 2.86 ftr   |
| Nylon/Polyethylene                 | 6.17 ftr                | 2.40 ftr   |
| CoexPP-Met/CoexPP (MB400)          | 1.02 pmt/as             | 2.06 pmt/as|
| OPP (MB200)/OPP (MB200)            | 2.79 ftr                | 1.87 ftr   |
| CoexPP/OPP (MB200)                 | 2.64 ftr                | 2.39 ftr   |
| CoexPP-Met/CoexPP (70 SPW)         | 0.98 pmt/as             | 2.04 pmt/as|
| CoexPP (125 BSR-ONE)/OPP (MB200)   | 3.77 ftr                | 3.85 ftr   |
| CoexPP-Met/CoexPP (125 BSR-ONE)    | 0.77 pmt/as             | 2.42 pmt/as|

Example 57

Isocyanate Terminated Prepolymer of Example 15 was evaluated with Polyester of Example 27 at a mix ratio of 100:60 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 2.96 ftr                | 2.79 ftr   |
| Nylon/Polyethylene                 | 5.00 ftr                | 3.10 ftr   |
| CoexPP-Met/CoexPP (MB400)          | 1.01 pmt/as             | 2.02 pmt/as|
| OPP (MB200)/OPP (MB200)            | 2.42 ftr                | 1.92 ftr   |
| CoexPP/OPP (MB200)                 | 2.43 ftr                | 2.00 ftr   |
| CoexPP-Met/CoexPP (70 SPW)         | 1.15 pmt/as             | 2.22 pmt/as|
| CoexPP (125 BSR-ONE)/OPP (MB200)   | 2.96 ftr                | 2.23 ftr   |
| CoexPP-Met/CoexPP (125 BSR-ONE)    | 0.88 pmt/as             | 1.99 pmt/as|

Example 58

Isocyanate Terminated Prepolymer of Example 16 was evaluated with Polyester of Example 27 at a mix ratio of 100:50 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 3.26 ftr                | 2.11 ftr   |
| Nylon/Polyethylene                 | 1.18 ftr                | 1.70 ftr   |
| CoexPP-Met/CoexPP (MB400)          | 0.87 as                 | 2.09 pmt/as|
| OPP (MB200)/OPP (MB200)            | 3.02 ftr                | 1.78 ftr   |
| CoexPP/OPP (MB200)                 | 2.70 ftr                | 2.86 ftr   |
| CoexPP-Met/CoexPP (70 SPW)         | 1.40 as                 | 2.08 pmt/as|
| CoexPP (125 BSR-ONE)/OPP (MB200)   | 3.48 ftr                | 3.70 ftr   |
| CoexPP-Met/CoexPP (125 BSR-ONE)    | 0.83 as                 | 2.26 pmt/as|

Example 59

Isocyanate Terminated Prepolymer of Example 16 was evaluated with Polyester of Example 27 at a mix ratio of 100:55 from a 50% Ethyl Acetate solution to yield a coating weight of 1.63 g/m$^2$. The bond strength was examined as a function of curing time and is reported below.

|                                    | Bond Strength (N/15 mm) |            |
| ---------------------------------- | ----------------------- | ---------- |
| Laminate Structure                 | 1 Day                   | 7 Day      |
| Polyester/Polyethylene             | 2.34 ftr                | 2.35 ftr   |
| Nylon/Polyethylene                 | 1.26 ftr                | 2.04 ftr   |
| CoexPP-Met/CoexPP (MB400)          | 0.60 as                 | 1.80 pmt/as|
| OPP (MB200)/OPP (MB200)            | 2.24 ftr                | 1.17 ftr   |
| CoexPP/OPP (MB200)                 | 3.06 ftr                | 2.50 ftr   |
| CoexPP-Met/CoexPP (70 SPW)         | 0.93 as                 | 1.67 pmt/as|
| CoexPP (125 BSR-ONE)/OPP (MB200)   | 3.08 ftr                | 2.84 ftr   |
| CoexPP-Met/CoexPP (125 BSR-ONE)    | 0.68 as                 | 1.88 pmt/as|

Example 60

Isocyanate Terminated Prepolymer of Example 17 was evaluated with Polyester of Example 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.65 ftr | 2.39 ftr |
| Nylon/Polyethylene | 1.51 ftr | 2.01 ftr |
| CoexPP-Met/CoexPP (MB400) | 1.48 as | 2.50 pmt/as |
| OPP (MB200)/OPP (MB200) | 2.25 ftr | 1.62 ftr |
| CoexPP/OPP (MB200) | 3.20 ftr | 2.74 ftr |
| CoexPP-Met/CoexPP (70 SPW) | 1.41 as | 2.11 pmt/as |
| CoexPP (125 BSR-ONE)/OPP (MB200) | 3.43 ftr | 3.75 ftr |
| CoexPP-Met/CoexPP (125 BSR-ONE) | 1.14 as | 2.38 pmt/as |

Example 61

Isocyanate Terminated Prepolymer of Ex. 17 was evaluated with Polyester of Ex. 27 at a mix ratio of 100:55 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.65 ftr | 2.71 ftr |
| Nylon/Polyethylene | 1.69 ftr | 1.84 ftr |
| CoexPP-Met/CoexPP (MB400) | 1.20 as | 2.14 pmt/as |
| OPP (MB200)/OPP (MB200) | 2.51 ftr | 2.61 ftr |
| CoexPP/OPP (MB200) | 3.24 ftr | 3.43 ftr |
| CoexPP-Met/CoexPP (70 SPW) | 1.40 as | 1.82 pmt/as |
| CoexPP (125 BSR-ONE)/OPP (MB200) | 3.22 ftr | 3.01 ftr |
| CoexPP-Met/CoexPP (125 BSR-ONE) | 1.28 as | 2.05 pmt/as |

Example 62

Isocyanate Terminated Bio-Based Prepolymer of Ex. 18 was evaluated with Bio-Based Polyester of Ex. 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 3.21 ftr | 3.34 ftr |
| Nylon/Polyethylene | 1.98 ftr | 2.08 ftr |
| CoexPP-Met/CoexPP (MB400) | 0.95 as | 1.74 pmt/as |
| OPP (MB200)/OPP (MB200) | 2.83 ftr | 3.27 ftr |
| CoexPP/OPP (MB200) | 2.79 ftr | 3.11 ftr |
| CoexPP-Met/CoexPP (70 SPW) | 0.90 as | 1.79 pmt/as |
| CoexPP (125 BSR-ONE)/OPP (MB200) | 3.40 ftr | 3.55 ftr |
| CoexPP-Met/CoexPP (125 BSR-ONE) | 1.17 as | 1.92 pmt/as |

Example 63

Isocyanate Terminated Prepolymer of Example 18 was evaluated with Polyester of Example 27 at a mix ratio of 100:55 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.52 ftr | 2.79 ftr |
| Nylon/Polyethylene | 2.04 ftr | 2.31 ftr |
| CoexPP-Met/CoexPP (MB400) | 1.03 as | 1.50 pmt/as |
| OPP (MB200)/OPP (MB200) | 3.08 ftr | 3.11 ftr |
| CoexPP/OPP (MB200) | 2.73 ftr | 3.02 ftr |
| CoexPP-Met/CoexPP (70 SPW) | 0.81 as | 1.83 pmt/as |
| CoexPP (125 BSR-ONE)/OPP (MB200) | 3.12 ftr | 3.39 ftr |
| CoexPP-Met/CoexPP (125 BSR-ONE) | 1.03 as | 1.50 pmt/as |

Example 64

Isocyanate Terminated Prepolymer of Example 18 was evaluated with Polyester of Example 27 at a mix ratio of 100:60 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 1.64 ftr | 2.00 ftr |
| Nylon/Polyethylene | 2.27 ftr | 3.09 ftr |
| CoexPP-Met/CoexPP (MB400) | 1.10 as | 1.61 pmt/as |
| OPP (MB200)/OPP (MB200) | 3.04 ftr | 3.30 ftr |
| CoexPP/OPP (MB200) | 2.73 ftr | 3.02 ftr |
| CoexPP-Met/CoexPP (70 SPW) | 1.22 as | 1.71 pmt/as |
| CoexPP (125 BSR-ONE)/OPP (MB200) | 3.10 ftr | 3.63 ftr |
| CoexPP-Met/CoexPP (125 BSR-ONE) | 1.14 as | 1.72 pmt/as |

Example 65

Isocyanate Terminated Prepolymer of Example 19 was evaluated with Polyester of Example 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 4.20 ftr | 2.18 ftr |
| Nylon/Polyethylene | 3.64 ftr | 7.76 ftr |
| CoexPP-Met/CoexPP (MB400) | 1.07 pmt/as | 1.47 pmt/as |
| OPP (MB200)/OPP (MB200) | 2.48 ftr | 1.20 ftr |
| CoexPP/OPP (MB200) | 2.76 ftr | 3.18 ftr |
| CoexPP-Met/CoexPP (70 SPW) | 1.43 pmt/as | 1.82 pmt/as |
| CoexPP (125 BSR-ONE)/OPP (MB200) | 3.57 ftr | 3.04 ftr |
| CoexPP-Met/CoexPP (125 BSR-ONE) | 1.30 pmt/as | 1.56 pmt/as |

Example 66

Isocyanate Terminated Prepolymer of Example 19 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.09 ftr | 3.60 ftr |
| Nylon/Polyethylene | 3.35 ftr | 3.76 ftr |
| CoexPP-Met/CoexPP (MB400) | 1.24 pmt/as | 1.30 pmt/as |
| OPP (MB200)/OPP (MB200) | 3.28 ftr | 3.02 ftr |
| CoexPP/OPP (MB200) | 2.86 ftr | 2.44 ftr |
| CoexPP-Met/CoexPP (70 SPW) | 1.08 pmt/as | 1.38 pmt/as |
| CoexPP (125 BSR-ONE)/OPP (MB200) | 3.56 ftr | 2.12 ftr |
| CoexPP-Met/CoexPP (125 BSR-ONE) | 1.33 pmt/as | 1.55 pmt/as |

Example 67

Isocyanate Terminated Prepolymer of Ex. 19 was evaluated with Polyester of Ex. 27 at a mix ratio of 100:60 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.91 ftr | 3.23 ftr |
| Nylon/Polyethylene | 3.23 ftr | 3.41 ftr |
| CoexPP-Met/CoexPP (MB400) | 1.10 pmt/as | 1.44 pmt/as |
| OPP (MB200)/OPP (MB200) | 2.81 ftr | 3.03 ftr |
| CoexPP/OPP (MB200) | 2.65 ftr | 2.91 ftr |
| CoexPP-Met/CoexPP (70 SPW) | 1.04 pmt/as | 1.44 pmt/as |
| CoexPP (125 BSR-ONE)/OPP (MB200) | 3.07 ftr | 3.13 ftr |
| CoexPP-Met/CoexPP (125 BSR-ONE) | 1.25 pmt/as | 1.59 pmt/as |

Example 68

Isocyanate Terminated Prepolymer of Example 19 was evaluated with Polyester of Example 28 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 4.57 ftr | 1.13 ftr |
| Nylon/Polyethylene | 6.21 ftr | 2.83 ftr |
| CoexPP-Met/CoexPP (MB400) | 1.32 pmt/as | 1.62 pmt/as |
| OPP (MB200)/OPP (MB200) | 1.64 ftr | 2.86 ftr |
| CoexPP/OPP (MB200) | 1.14 ftr | 2.08 ftr |
| CoexPP-Met/CoexPP (70 SPW) | 1.54 pmt/as | 1.77 pmt/as |
| CoexPP (125 BSR-ONE)/OPP (MB200) | 1.26 ftr | 3.41 ftr |
| CoexPP-Met/CoexPP (125 BSR-ONE) | 1.45 pmt/as | 1.62 pmt/as |

Example 69

Isocyanate Terminated Prepolymer of Example 19 was evaluated with Polyester of Example 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 4.02 ftr | 1.73 ftr |
| Nylon/Polyethylene | 3.71 ftr | 3.19 ftr |
| CoexPP-Met/CoexPP (MB400) | 0.89 pmt/as | 1.22 pmt/as |
| OPP (MB200)/OPP (MB200) | 1.82 ftr | 2.50 ftr |
| CoexPP/OPP (MB200) | 1.87 ftr | 1.95 ftr |
| CoexPP-Met/CoexPP (70 SPW) | 0.97 pmt/as | 1.67 pmt/as |
| CoexPP (125 BSR-ONE)/OPP (MB200) | 1.11 ftr | 3.72 ftr |
| CoexPP-Met/CoexPP (125 BSR-ONE) | 1.29 pmt/as | 1.96 pmt/as |

Example 70

Isocyanate Terminated Prepolymer of Example 20 was evaluated with Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 0.92 as | 1.97 ftr |
| Nylon/Polyethylene | 1.44 as | 6.53 ftr |
| CoexPP-Met/CoexPP (MB400) | 0.29 as | 0.80 pmt/as |
| OPP (MB200)/OPP (MB200) | 0.89 as | 2.41 ftr |
| CoexPP/OPP (MB200) | 0.68 as | 1.34 ftr |
| CoexPP-Met/CoexPP (70 SPW) | 0.58 as | 1.03 pmt/as |
| CoexPP (125 BSR-ONE)/OPP (MB200) | 1.22 as | 3.32 ftr |
| CoexPP-Met/CoexPP (125 BSR-ONE) | 0.81 as | 1.07 pmt/as |

Example 71

Isocyanate Terminated Prepolymer of Ex. 20 was evaluated with Polyester of Ex. 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 0.92 as | 1.68 ftr |
| Nylon/Polyethylene | 1.10 as | 1.34 ftr |
| CoexPP-Met/CoexPP (MB400) | 0.26 as | 0.57 pmt/as |
| OPP (MB200)/OPP (MB200) | 0.81 as | 1.61 ftr |
| CoexPP/OPP (MB200) | 0.63 as | 1.33 ftr |
| CoexPP-Met/CoexPP (70 SPW) | 0.85 as | 0.68 pmt/as |
| CoexPP (125 BSR-ONE)/OPP (MB200) | 0.50 as | 1.42 ftr |
| CoexPP-Met/CoexPP (125 BSR-ONE) | 0.65 as | 0.83 pmt/as |

Example 72

Isocyanate Terminated Prepolymer of Example 21 was evaluated with Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 4.23 ftr | 3.08 ftr |
| Nylon/Polyethylene | 4.56 ftr | 4.81 ftr |
| CoexPP-Met/CoexPP (MB400) | 1.20 pmt/as | 1.56 pmt/as |
| OPP (MB200)/OPP (MB200) | 2.49 ftr | 1.90 ftr |
| CoexPP/OPP (MB200) | 3.05 ftr | 2.59 ftr |
| CoexPP-Met/CoexPP (70 SPW) | 1.63 pmt/as | 1.76 pmt/as |
| CoexPP (125 BSR-ONE)/OPP (MB200) | 3.15 ftr | 2.62 ftr |
| CoexPP-Met/CoexPP (125 BSR-ONE) | 1.70 pmt/as | 1.72 pmt/as |

Example 73

Isocyanate Terminated Prepolymer of Example 21 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.56 ftr | 2.08 ftr |
| Nylon/Polyethylene | 2.69 ftr | 3.65 ftr |
| CoexPP-Met/CoexPP (MB400) | 0.81 pmt/as | 1.01 pmt/as |
| OPP (MB200)/OPP (MB200) | 2.65 ftr | 2.18 ftr |
| CoexPP/OPP (MB200) | 2.33 ftr | 1.28 ftr |
| CoexPP-Met/CoexPP (70 SPW) | 1.25 pmt/as | 1.43 pmt/as |
| CoexPP (125 BSR-ONE)/OPP (MB200) | 1.21 ftr | 2.20 ftr |
| CoexPP-Met/CoexPP (125 BSR-ONE) | 1.11 pmt/as | 1.20 pmt/as |

Example 74

Isocyanate Terminated Prepolymer of Example 20 was evaluated with Polyester of Example 28 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.30 ftr | 1.96 ftr |
| Nylon/Polyethylene | 5.13 ftr | 3.60 ftr |
| CoexPP-Met/CoexPP (MB400) | 1.78 pmt/as | 1.71 pmt/as |
| OPP (MB200)/OPP (MB200) | 2.38 ftr | 1.79 ftr |
| CoexPP/OPP (MB200) | 1.29 ftr | 2.38 ftr |
| CoexPP-Met/CoexPP (70 SPW) | 2.03 pmt/as | 1.75 pmt/as |
| CoexPP (125 BSR-ONE)/OPP (MB200) | 2.70 ftr | 1.98 ftr |
| CoexPP-Met/CoexPP (125 BSR-ONE) | 1.92 pmt/as | 2.56 pmt/as |

Example 75

Isocyanate Terminated Prepolymer of Example 20 was evaluated with Polyester of Example 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.97 ftr | 2.35 ftr |
| Nylon/Polyethylene | 4.56 ftr | 2.21 ftr |
| CoexPP-Met/CoexPP (MB400) | 1.39 pmt/as | 1.39 pmt/as |
| OPP (MB200)/OPP (MB200) | 1.92 ftr | 1.67 ftr |
| CoexPP/OPP (MB200) | 2.99 ftr | 2.86 ftr |
| CoexPP-Met/CoexPP (70 SPW) | 1.64 pmt/as | 1.97 pmt/as |
| CoexPP (125 BSR-ONE)/OPP (MB200) | 2.39 ftr | 3.49 ftr |
| CoexPP-Met/CoexPP (125 BSR-ONE) | 1.77 pmt/as | 2.05 pmt/as |

Example 76

Isocyanate Terminated Prepolymer of Example 21 was evaluated with Polyester of Example 28 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.46 ftr | 2.51 ftr |
| Nylon/Polyethylene | 5.20 ftr | 2.12 ftr |
| CoexPP-Met/CoexPP (MB400) | 1.40 pmt/as | 1.71 pmt/as |
| OPP (MB200)/OPP (MB200) | 1.89 ftr | 2.13 ftr |
| CoexPP/OPP (MB200) | 3.14 ftr | 3.56 ftr |
| CoexPP-Met/CoexPP (70 SPW) | 1.59 pmt/as | 1.89 pmt/as |
| CoexPP (125 BSR-ONE)/OPP (MB200) | 2.51 ftr | 1.49 ftr |
| CoexPP-Met/CoexPP (125 BSR-ONE) | 1.39 pmt/as | 1.92 pmt/as |

Example 77

Isocyanate Terminated Prepolymer of Ex. 21 was evaluated with Polyester of Ex. 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.92 ftr | 2.94 ftr |
| Nylon/Polyethylene | 4.01 ftr | 3.52 ftr |
| CoexPP-Met/CoexPP (MB400) | 1.18 pmt/as | 1.63 pmt/as |
| OPP (MB200)/OPP (MB200) | 1.56 ftr | 1.68 ftr |
| CoexPP/OPP (MB200) | 2.52 ftr | 2.31 ftr |
| CoexPP-Met/CoexPP (70 SPW) | 1.47 pmt/as | 1.70 pmt/as |
| CoexPP (125 BSR-ONE)/OPP (MB200) | 2.80 ftr | 2.99 ftr |
| CoexPP-Met/CoexPP (125 BSR-ONE) | 1.37 pmt/as | 1.68 pmt/as |

Example 78

Isocyanate Terminated Prepolymer of Example 22 was evaluated with Polyester of Example 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.00 ftr | 1.61 ftr |
| Nylon/Polyethylene | 4.63 ftr | 5.26 ftr |
| CoexPP-Met/CoexPP (MB400) | 1.05 pmt/as | 1.29 pmt/as |
| OPP (MB200)/OPP (MB200) | 2.77 ftr | 2.61 ftr |
| CoexPP/OPP (MB200) | 3.15 ftr | 3.10 ftr |
| CoexPP-Met/CoexPP (70 SPW) | 1.10 pmt/as | 1.49 pmt/as |
| CoexPP (125 BSR-ONE)/OPP (MB200) | 2.93 ftr | 3.25 ftr |
| CoexPP-Met/CoexPP (125 BSR-ONE) | 0.88 pmt/as | 1.30 pmt/as |

Example 79

Isocyanate Terminated Prepolymer of Example 22 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 2.67 ftr | 2.18 ftr |
| Nylon/Polyethylene | 3.86 ftr | 4.97 ftr |
| CoexPP-Met/CoexPP (MB400) | 0.85 pmt/as | 1.19 pmt/as |
| OPP (MB200)/OPP (MB200) | 1.92 ftr | 2.12 ftr |
| CoexPP/OPP (MB200) | 2.37 ftr | 2.66 ftr |
| CoexPP-Met/CoexPP (70 SPW) | 0.98 pmt/as | 1.32 pmt/as |
| CoexPP (125 BSR-ONE)/OPP (MB200) | 2.01 ftr | 2.26 ftr |
| CoexPP-Met/CoexPP (125 BSR-ONE) | 0.78 pmt/as | 1.10 pmt/as |

Example 80

Isocyanate Terminated Prepolymer of Example 22 was evaluated with Polyester of Example 28 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.49 ftr | 3.08 ftr |
| Nylon/Polyethylene | 3.39 ftr | 4.27 ftr |
| CoexPP-Met/CoexPP (MB400) | 1.03 pmt/as | 1.47 pmt/as |
| OPP (MB200)/OPP (MB200) | 2.71 ftr | 2.50 ftr |
| CoexPP/OPP (MB200) | 3.17 ftr | 2.76 ftr |
| CoexPP-Met/CoexPP (70 SPW) | 0.98 pmt/as | 1.48 pmt/as |
| CoexPP (125 BSR-ONE)/OPP (MB200) | 3.54 ftr | 2.43 ftr |
| CoexPP-Met/CoexPP (125 BSR-ONE) | 1.05 pmt/as | 1.67 pmt/as |

Example 81

Isocyanate Terminated Prepolymer of Example 22 was evaluated with Polyester of Example 28 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.22 ftr | 3.06 ftr |
| Nylon/Polyethylene | 3.42 ftr | 3.79 ftr |
| CoexPP-Met/CoexPP (MB400) | 0.86 pmt/as | 1.19 pmt/as |
| OPP (MB200)/OPP (MB200) | 2.63 ftr | 2.37 ftr |
| CoexPP/OPP (MB200) | 3.08 ftr | 3.10 ftr |
| CoexPP-Met/CoexPP (70 SPW) | 0.91 pmt/as | 1.19 pmt/as |
| CoexPP (125 BSR-ONE)/OPP (MB200) | 3.34 ftr | 2.91 ftr |
| CoexPP-Met/CoexPP (125 BSR-ONE) | 0.87 pmt/as | 1.23 pmt/as |

Example 82

Isocyanate Terminated Prepolymer of Ex. 23 was evaluated with Polyester of Ex. 27 at a mix ratio of 100:50 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.85 ftr | 2.29 ftr |
| Nylon/Polyethylene | 3.60 ftr | 5.34 ftr |
| CoexPP-Met/CoexPP (MB400) | 1.30 pmt/as | 1.63 pmt/as |
| OPP (MB200)/OPP (MB200) | 2.11 ftr | 2.13 ftr |
| CoexPP/OPP (MB200) | 2.28 ftr | 2.47 ftr |
| CoexPP-Met/CoexPP (70 SPW) | 1.12 pmt/as | 1.59 pmt/as |
| CoexPP (125 BSR-ONE)/OPP (MB200) | 3.29 ftr | 3.27 ftr |
| CoexPP-Met/CoexPP (125 BSR-ONE) | 1.09 pmt/as | 1.78 pmt/as |

Example 83

Isocyanate Terminated Prepolymer of Example 23 was evaluated with Polyester of Example 27 at a mix ratio of 100:55 from a 50% Ethyl Acetate solution to yield a coating weight of 1.63 g/m². The bond strength was examined as a function of curing time and is reported below.

|  | Bond Strength (N/15 mm) | |
| --- | --- | --- |
| Laminate Structure | 1 Day | 7 Day |
| Polyester/Polyethylene | 3.21 ftr | 3.04 ftr |
| Nylon/Polyethylene | 2.90 ftr | 4.30 ftr |
| CoexPP-Met/CoexPP (MB400) | 1.12 pmt/as | 1.35 pmt/as |
| OPP (MB200)/OPP (MB200) | 1.92 ftr | 2.11 ftr |
| CoexPP/OPP (MB200) | 2.18 ftr | 2.30 ftr |
| CoexPP-Met/CoexPP (70 SPW) | 1.02 pmt/as | 1.49 pmt/as |
| CoexPP (125 BSR-ONE)/OPP (MB200) | 2.90 ftr | 2.96 ftr |
| CoexPP-Met/CoexPP (125 BSR-ONE) | 0.91 pmt/as | 1.53 pmt/as |

Example 84

Isocyanate Terminated Prepolymer of Example 24 was evaluated with Polyester of Example 27 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 3.10 ftr | 2.91 ftr |
| Nylon/Polyethylene | 6.01 ftr | 6.80 ftr |
| CoexPP-Met/CoexPP (MB400) | 0.89 pmt/as | 2.06 pmt/as |
| OPP (MB200)/OPP (MB200) | 2.80 ftr | 2.86 ftr |
| CoexPP/OPP (MB200) | 2.85 ftr | 2.28 ftr |
| CoexPP-Met/CoexPP (70 SPW) | 0.97 pmt/as | 1.84 pmt/as |
| CoexPP (125 BSR-ONE)/OPP (MB200) | 3.16 ftr | 3.47 ftr |
| CoexPP-Met/CoexPP (125 BSR-ONE) | 0.66 pmt/as | 1.70 pmt/as |

Example 85

Isocyanate Terminated Prepolymer of Example 24 was evaluated with Polyester of Example 27 at a mix ratio of 100:55 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 2.90 ftr | 3.99 ftr |
| Nylon/Polyethylene | 5.04 ftr | 5.83 ftr |
| CoexPP-Met/CoexPP (MB400) | 0.81 pmt/as | 1.81 pmt/as |
| OPP (MB200)/OPP (MB200) | 2.57 ftr | 2.59 ftr |
| CoexPP/OPP (MB200) | 2.62 ftr | 1.97 ftr |
| CoexPP-Met/CoexPP (70 SPW) | 0.88 pmt/as | 1.62 pmt/as |
| CoexPP (125 BSR-ONE)/OPP (MB200) | 2.96 ftr | 2.97 ftr |
| CoexPP-Met/CoexPP (125 BSR-ONE) | 0.57 pmt/as | 1.44 pmt/as |

Example 86

Isocyanate Terminated Prepolymer of Example 24 was evaluated with Polyester of Example 28 at a mix ratio of 100:50 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 3.42 ftr | 2.39 ftr |
| Nylon/Polyethylene | 4.92 ftr | 6.02 ftr |
| CoexPP-Met/CoexPP (MB400) | 0.88 pmt/as | 1.74 pmt/as |
| OPP (MB200)/OPP (MB200) | 3.14 ftr | 2.15 ftr |
| CoexPP/OPP (MB200) | 3.07 ftr | 3.13 ftr |
| CoexPP-Met/CoexPP (70 SPW) | 1.09 pmt/as | 2.13 pmt/as |
| CoexPP (125 BSR-ONE)/OPP (MB200) | 3.40 ftr | 3.24 ftr |
| CoexPP-Met/CoexPP (125 BSR-ONE) | 0.91 pmt/as | 2.12 pmt/as |

Example 87

Isocyanate Terminated Prepolymer of Ex. 24 was evaluated with Polyester of Ex. 28 at a mix ratio of 100:55 from a 50% Ethyl Acetate solution to yield a coating weight of 1.63 g/m². The bond strength was examined as a function of curing time and is reported below.

| Laminate Structure | Bond Strength (N/15 mm) | |
|---|---|---|
| | 1 Day | 7 Day |
| Polyester/Polyethylene | 3.22 ftr | 3.03 ftr |
| Nylon/Polyethylene | 4.48 ftr | 5.61 ftr |
| CoexPP-Met/CoexPP (MB400) | 0.76 pmt/as | 1.56 pmt/as |
| OPP (MB200)/OPP (MB200) | 2.98 ftr | 2.46 ftr |
| CoexPP/OPP (MB200) | 2.81 ftr | 2.70 ftr |
| CoexPP-Met/CoexPP (70 SPW) | 0.88 pmt/as | 1.88 pmt/as |
| CoexPP (125 BSR-ONE)/OPP (MB200) | 2.98 ftr | 3.09 ftr |
| CoexPP-Met/CoexPP (125 BSR-ONE) | 0.70 pmt/as | 1.93 pmt/as |

Example 88

Isocyanate Terminated Prepolymer of Example 22, 23, and 24 were evaluated with Polyester of Example 27 at a mix ratio of 100:50 as a solventless system on a PolyType Coater at an application temperature of 40° C. to yield a coating weight of 1.63 g/m² with the CoexPP-Met/CoexPP (MB400) structure. The bond strength was examined as a function of curing time and is reported below.

| Bio-Based Prepolymer of Ex. | Laminate Structure | Bond Strength (N/15 mm) | |
|---|---|---|---|
| | | 1 Day | 7 Day |
| 22 | CoexPP-Met/CoexPP (MB400) | 0.80 pmt/as | 1.40 pmt/as |
| 23 | CoexPP-Met/CoexPP (MB400) | 0.87 pmt/as | 1.34 pmt/as |
| 24 | CoexPP-Met/CoexPP (MB400) | 1.00 pmt/as | 1.44 pmt/as |

Example 89

Isocyanate Terminated Prepolymer of Example 22, 23, and 24 were evaluated with Polyester of Example 28 at a mix ratio of 100:50 as a solventless system on a PolyType Coater at an application temperature of 40° C. to yield a coating weight of 1.63 g/m² with the CoexPP-Met/CoexPP (MB400) structure. The bond strength was examined as a function of curing time and is reported below.

| Bio-Based Prepolymer of Ex. | Laminate Structure | Bond Strength (N/15 mm) | |
|---|---|---|---|
| | | 1 Day | 7 Day |
| 22 | CoexPP-Met/CoexPP (MB400) | 0.81 pmt/as | 1.45 pmt/as |
| 23 | CoexPP-Met/CoexPP (MB400) | 0.92 pmt/as | 1.45 pmt/as |
| 24 | CoexPP-Met/CoexPP (MB400) | 1.19 pmt/as | 1.48 pmt/as |

The invention claimed is:
1. An isocyanate-terminated prepolymer comprising: (a) 30-60 wt % polymerized residues of a first polyol comprising a substituent of formula (I)

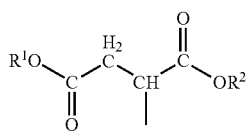

attached via a carbon-carbon single bond to a saturated carbon atom in a fatty acid hydrocarbyl group; wherein $R^1$ and $R^2$ are esterified residues of aliphatic or cycloaliphatic diols; and wherein the first polyol comprises: (i) from 0.33 to 0.4 units of formula (I) per fatty acid hydrocarbyl group, and (ii) from 0 to 12 wt % esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the first polyol has a hydroxyl number from 75 to 150 mg KOH/g; (b) 40-55 wt % polymerized residues of diphenyl methane diisocyanate (MDI); and (c) 0-20 wt % polymerized residues of a glycol having $M_n$ from 300 to 3500.

2. The isocyanate-terminated prepolymer of claim 1 in which the first polyol comprises from 3 wt % to 9 wt % of esterified residues of at least one $C_4$-$C_{12}$ anhydride, $C_4$-$C_{12}$ diacid or $C_4$-$C_{12}$ lactone.

3. The isocyanate-terminated prepolymer of claim 2 in which the first polyol comprises from 0.35 to 0.38 units of formula (I) per fatty acid hydrocarbyl group.

4. The isocyanate-terminated prepolymer of claim 3 in which the first polyol comprises from 15 wt % to 27 wt % polymerized residues of at least one $C_2$-$C_8$ aliphatic diol and has a hydroxyl number from 100 to 125 mg KOH/g.

5. The isocyanate-terminated prepolymer of claim 4 comprising 4-14 wt % polymerized residues of a glycol having $M_n$ from 300 to 3500.

6. A two-component urethane system comprising: (1) an isocyanate-terminated prepolymer comprising: (a) 30-60 wt % polymerized residues of a first polyol comprising a substituent of formula (I)

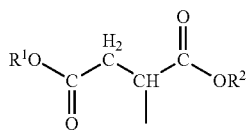

attached via a carbon-carbon single bond (shown attached to the "CH" group in formula (I) to a saturated carbon atom in a fatty acid hydrocarbyl group; wherein $R^1$ and $R^2$ are esterified residues of aliphatic or cycloaliphatic diols; and wherein the first polyol comprises: (i) from 0.33 to 0.4 units of formula (I) per fatty acid hydrocarbyl group, and (ii) from 0 to 12 wt % of esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the first polyol has a hydroxyl number from 75 to 150 mg KOH/g; (b) 40-55 wt % polymerized residues of diphenyl methane diisocyanate (MDI); and (c) 0-20 wt % polymerized residues of a glycol having $M_n$ from 300 to 3500; and (2) a second polyol having a hydroxyl number (OHN) from 50 to 250 mg KOH/g and $M_n$ from 300 to 5000.

7. The two-component urethane system of claim 6 in which the first polyol comprises from 3 wt % to 9 wt % esterified residues of at least one $C_4$-$C_{12}$ anhydride, $C_4$-$C_{12}$ diacid or $C_4$-$C_{12}$ lactone.

8. The two-component urethane system of claim 7 in which the second polyol comprises a substituent of formula (I)

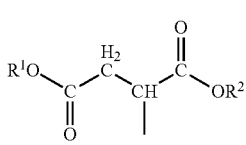

attached via a carbon-carbon single bond to a saturated carbon atom in a fatty acid hydrocarbyl group; wherein $R^1$ and $R^2$ are esterified residues of aliphatic or cycloaliphatic diols; and wherein the polyol comprises: (i) from 0.3 to 0.5 units of formula (I) per fatty acid hydrocarbyl group, and (ii) from 0 to 15 wt % esterified residues of at least one $C_4$-$C_{12}$ anhydride, $C_4$-$C_{12}$ diacid or $C_4$-$C_{12}$ lactone, not including units of formula (I) attached to a fatty acid hydrocarbyl group; and wherein the polyol has a hydroxyl number from 100 to 225 mg KOH/g.

9. The two-component urethane system of claim 8 in which polymerized residues of at least one $C_2$-$C_8$ aliphatic diol are present in the second polyol in an amount from 15 wt % to 32 wt % and the second polyol has a hydroxyl number from 150 to 195 mg KOH/g.

10. The two-component urethane system of claim 9 in which the second polyol comprises 3 wt % to 9 wt % esterified residues of a $C_8$-$C_{12}$ aromatic anhydride.

* * * * *